(12) United States Patent
Henocq et al.

(10) Patent No.: US 7,466,865 B2
(45) Date of Patent: Dec. 16, 2008

(54) METHOD AND DEVICE FOR ANALYZING VIDEO SEQUENCES IN A COMMUNICATION NETWORK

(75) Inventors: Xavier Henocq, Acigne (FR); Maryline Clare, Rennes (FR)

(73) Assignee: Canon Europa, N.V., Amstelveen (NL)

( * ) Notice: Subject to any disclaimer, the term of this patent is extended or adjusted under 35 U.S.C. 154(b) by 964 days.

(21) Appl. No.: 10/779,284

(22) Filed: Feb. 13, 2004

(65) Prior Publication Data

US 2004/0184529 A1 Sep. 23, 2004

(30) Foreign Application Priority Data

Feb. 14, 2003 (FR) .................................. 03 01847

(51) Int. Cl.
*G06K 9/36* (2006.01)
(52) U.S. Cl. ........................ 382/239; 382/238; 382/240
(58) Field of Classification Search ................ 382/239, 382/240, 238; 375/240, 240.21; 600/431; 422/355; 137/1
See application file for complete search history.

(56) References Cited

U.S. PATENT DOCUMENTS

| | | | | |
|---|---|---|---|---|
| 5,253,169 A | * | 10/1993 | Corby, Jr. .................... | 600/431 |
| 5,751,346 A | | 5/1998 | Dozier et al. ................ | 348/153 |
| 6,201,833 B1 | | 3/2001 | Kondo et al. ............ | 375/240.12 |
| 6,256,350 B1 | * | 7/2001 | Bishay et al. .......... | 375/240.21 |

(Continued)

FOREIGN PATENT DOCUMENTS

FR  2 811 186  1/2002

WO  WO 01/62005 A1  8/2001

OTHER PUBLICATIONS

E. Feig and S. Winograd "Fast Algorithms for the Discrete Cosine Transform", IEEE Transactions On Signal Processing, vol. 40, No. 9, Sep. 1992.
IEEE 1212 Std.—2001, Standard for Control and Status Registers Architecture for Microcomputer Buses, IEEE, Inc., Sep. 6, 2002, 67 pages.
Gary Sullivan, "Draft Text of Recommendation H.263 Version 2 (H.263+) for Decision", Technical Report *ITU-T, Draft 21*, Sep. 26, 1997, 143 pages.

(Continued)

*Primary Examiner*—Anh Hong Do
(74) *Attorney, Agent, or Firm*—Fitzpatrick, Cella, Harper & Scinto

(57) ABSTRACT

The invention relates to a method of analyzing at least one video sequence present on at least one sending apparatus, in a communication network also comprising at least one receiving apparatus, wherein, the video sequence being compressed with an encoding method which generates a bitstream comprising information representing the temporal activity of the images of the video sequence and information representing the spatial activity of the images of that video sequence, and the temporal and spatial information being distributed between one or more spatio-temporal hierarchical levels, the method comprises the following steps performed at the receiving apparatus:

obtaining information representing the temporal activity of the video sequence present on the sending apparatus, analyzing the temporal information obtained, as a function of the result of the analysis, deciding whether the generation of a request destined for the sending apparatus for the obtainment of information representing the spatial activity of the video sequence is necessary.

36 Claims, 16 Drawing Sheets

U.S. PATENT DOCUMENTS

| | | | | |
|---|---|---|---|---|
| 6,278,735 | B1 * | 8/2001 | Mohsenian | 375/240 |
| 6,323,897 | B1 | 11/2001 | Kogane et al. | 348/159 |
| 6,411,209 | B1 | 6/2002 | Lyons et al. | 340/541 |
| 6,456,321 | B1 | 9/2002 | Ito et al. | 348/143 |
| 6,480,225 | B1 | 11/2002 | Kim | 348/143 |
| 6,661,927 | B1 * | 12/2003 | Suarez et al. | 382/240 |
| 6,766,817 | B2 * | 7/2004 | da Silva | 137/1 |
| 7,285,255 | B2 * | 10/2007 | Kadlec et al. | 422/305 |

OTHER PUBLICATIONS

Patent Abstracts of Japan, vol. 2000, No. 09, Publication No. JP 2000175198, Oct. 13, 2000.

Patent Abstracts of Japan, vol. 2002, No. 03, Patent No. JP 2001309337, Nov. 2, 2001.

* cited by examiner

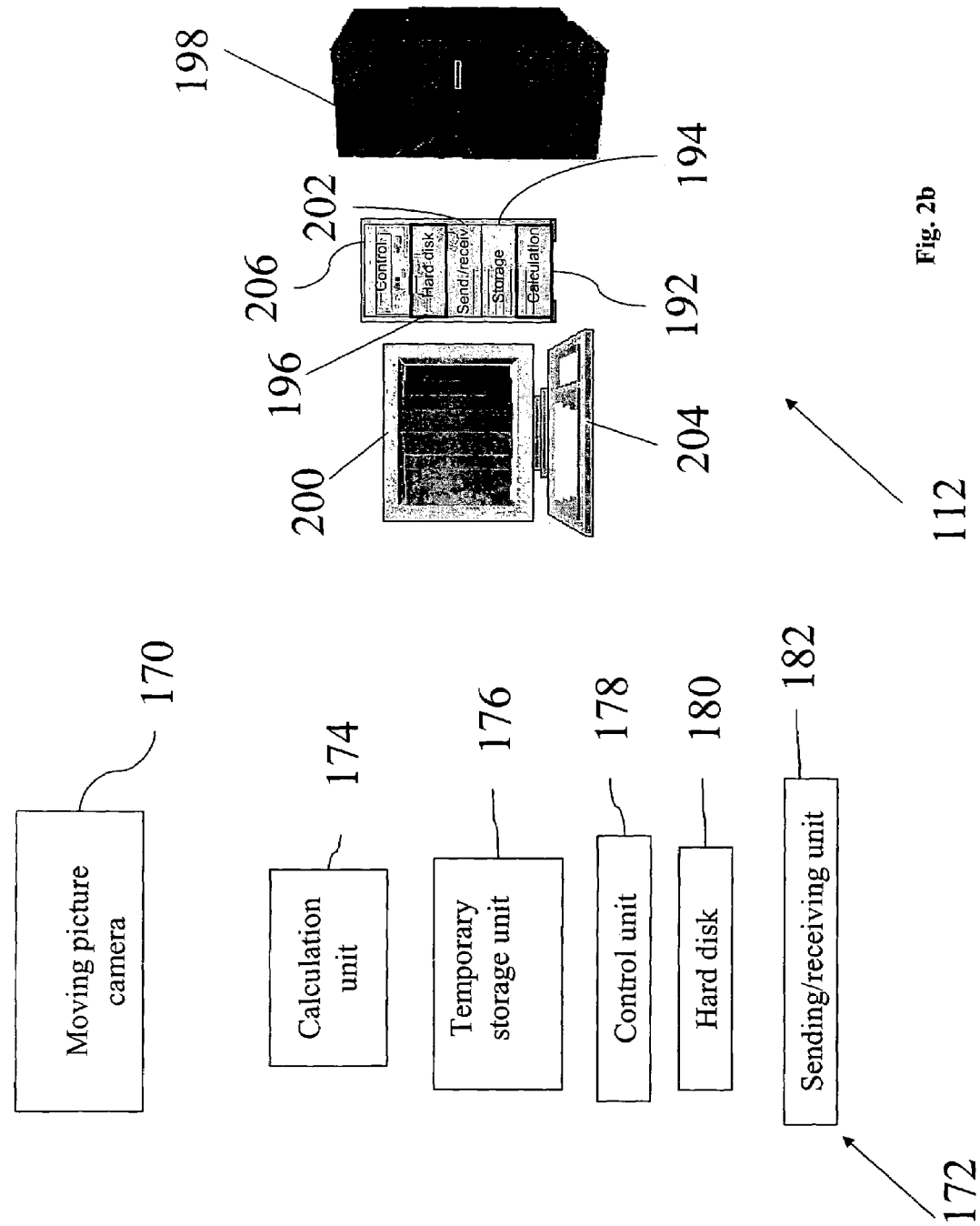

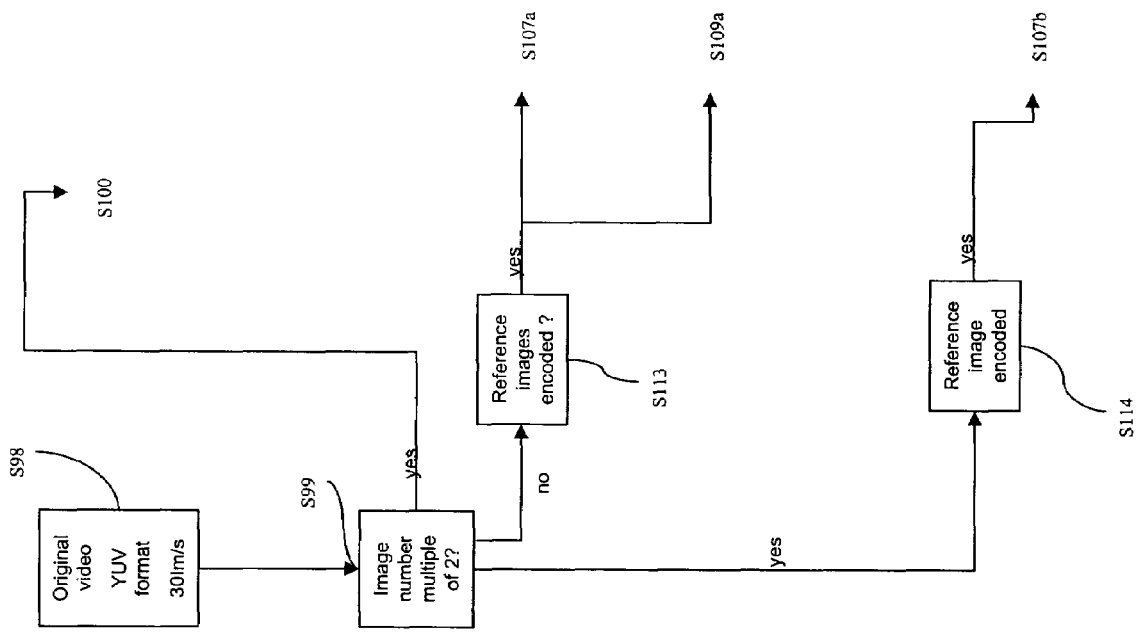
Fig. 5a1

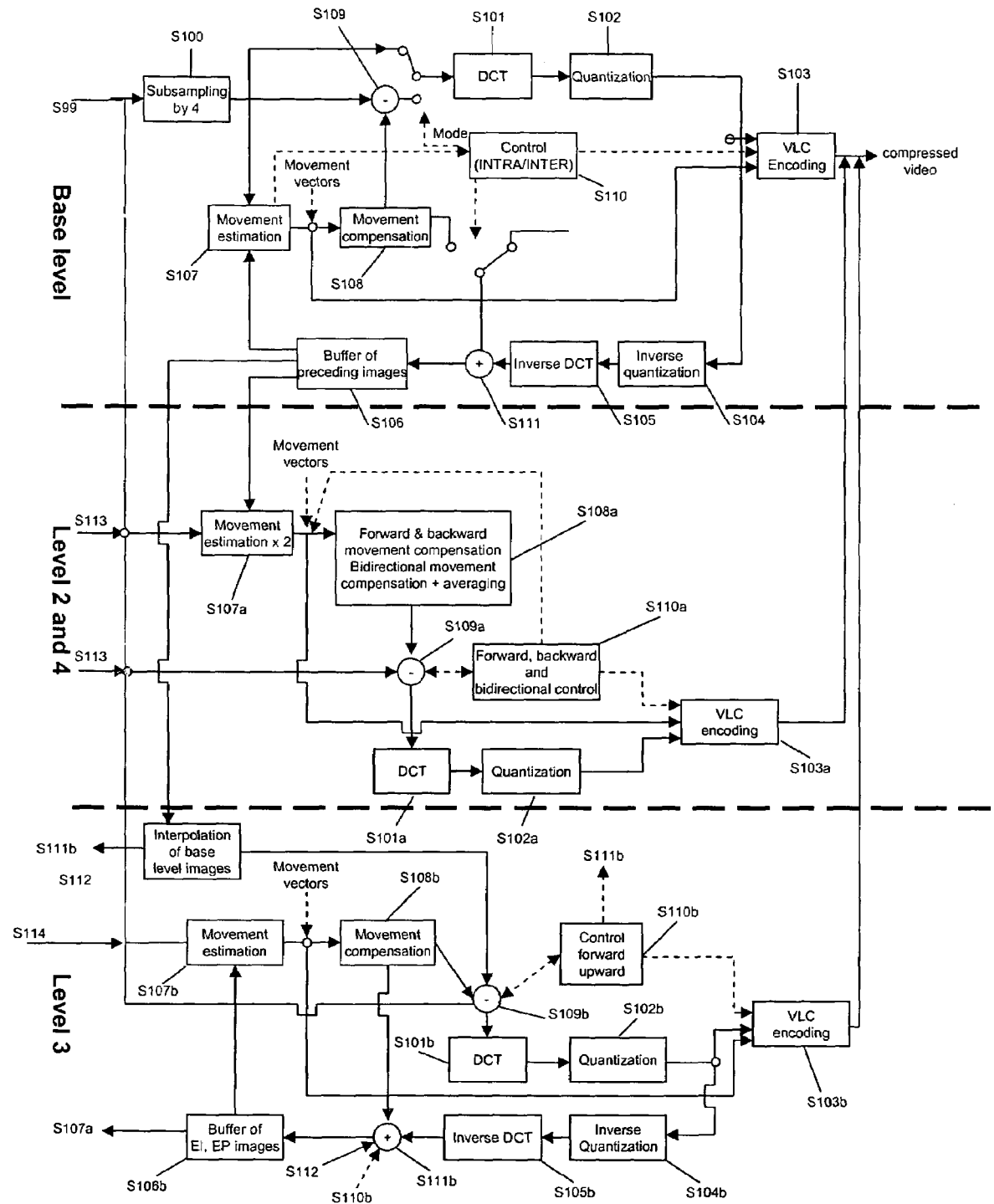
Fig. 5a2

METHOD AND DEVICE FOR ANALYZING VIDEO SEQUENCES IN A COMMUNICATION NETWORK

This application claims the right of priority under 35 USC § 119 based on French patent application number 0301847 filed on 14 Feb. 2003.

FIELD OF THE INVENTION

The invention relates to a method and device for analyzing at least one video sequence present on at least one sending apparatus in a communication network also comprising at least one receiving apparatus.

BACKGROUND OF THE INVENTION

These days, the protection of possessions and persons is a continuously growing phenomenon and the proof of this is the sales of alarm systems which have considerably increased in recent years, in particular driven by insurance companies.

Alarm systems include car alarms, anti-intrusion alarms to protect against intrusion within premises, video surveillance systems, etc.

It should be noted that the use of video surveillance systems in a home environment is far from being popularized, in particular due to the cost associated with such systems.

Indeed, a video surveillance system requires the purchase of surveillance cameras, storage and display units for the videos taken by the cameras and the setting up of a local communication network dedicated to the transfer of the video data.

It would consequently be desirable to have a video surveillance system able to use a local home network not dedicated to a particular application, such as video surveillance, to which may be connected a great variety of multimedia equipment sending or receiving data.

In a video surveillance network, several surveillance cameras take images simultaneously and encode them in a compressed manner.

A user of a central computer connected to the different surveillance cameras via a communication network will receive those compressed videos, will store them and view them on his computer.

However, it will not be possible for the computer to simultaneously view a high number of video sequences, both due to the difficulty for a human being to simultaneously view several video sequences with sustained attention, and due to the fact that the calculation capacities of the central computer, in particular in a local home network, generally do not enable a high number of video sequences to be decoded in real time.

Furthermore, it is very probable that the local home network will not have a bandwidth compatible with the simultaneous transport of numerous videos at full quality.

Hence the user of such a video surveillance system will prefer to view only relevant video sequences, in which movement occurs.

Furthermore, it would be more comfortable for the user to be able to have a video surveillance system able to automatically select the relevant video sequences without the user having to intervene.

From the international application WO 01 62005 entitled "Remote surveillance system" a video surveillance system is known in which the user must make an explicit request in order to obtain the video data captured by a surveillance camera.

Once the video data have been received from a video camera, the user may adjust the quality of those video data by modifying the frame rate, the format, and by filtering the different images constituting that video.

The adjustment of quality is made via a graphical interface and requires intervention by the user.

From the patent U.S. Pat. No. 5,751,346 a video surveillance system is also known which is used in the context of the surveillance of automatic teller machines and which automatically adjusts the frame rate of the images of the video sequence by analyzing the changes made between two images.

This analysis is made at each camera.

Such a system does not make it possible to conjointly adjust the quality of all the videos captured by the different cameras of a video surveillance system.

It should moreover be noted that the object of that video surveillance system is not to directly transmit video sequences, but rather to store them.

A similar system is also known from the patent U.S. Pat. No. 6,480,225.

In these last two patents, the simultaneous detection of alarms by several cameras is not taken into account, in that they detect a significant movement at the same time.

In another patent, U.S. Pat. No. 6,411,209, a video surveillance system uses a continuously operating camera coupled to an anti-intrusion alarm system such as an infrared sensor.

When an alarm is detected, the camera having detected the alarm stores a portion of video corresponding to a period encompassing the event which triggered the alarm. An analysis which is based on movement detection methods, recognition of forms or faces is then made at the camera.

If the alarm is confirmed further to the aforementioned analysis, the most relevant images of the portion of video sequence analyzed are transmitted to a central computer where a user operates.

Such a system does not make it possible to adjust the spatial quality of the video sequence, nor to make overall adjustment of the quality of each video sequence captured at each of the different cameras of the network taking into account the constraints related to the central computer and the bandwidth available on the network.

Moreover, it is not explained how that system makes it possible to take into account the simultaneous detection of alarms by several cameras for which there is in fact a risk of mutual hindrance at the time of the simultaneous transmission of video sequences to the central computer.

Moreover, simultaneous detections of alarms risk causing congestion of the network when the data are later transmitted simultaneously or practically simultaneously.

Furthermore, that system requires a high calculation capacity at each camera.

A video surveillance system is also known from the patent US 6,456,321 using a camera which produces both a highly compressed signal of low quality and a signal with little compression.

When no alarm is detected by the camera, only the highly compressed video signal is transmitted over a network to the central computer where a user operates, whereas the other video signal with low compression is stored at the camera.

When an alarm is triggered, the highly compressed signal is displayed, after decompression, on the screen of the user who may then decide whether or not to receive the video signal with little compression present at the camera.

Here too, action by the user is necessary in dealing with the alarms.

The aforementioned video surveillance system does not make it possible to automatically adjust the quality of video sequences globally for the entire network.

That system does not make it possible to take into account the simultaneous detection of alarms by several cameras either.

In addition, from the document U.S. Pat. No. 6,323,897, a video surveillance system is known in which several cameras are connected to a central server via a communication network of TCP/IP type.

On each camera is included, in particular, a movement detector, a microphone and an analyzer of the traffic conveyed by the network.

Where the traffic is low, all the cameras can send video and audio data continuously to the server. However, when the traffic becomes high, only the camera which has detected an alarm will send.

Depending on how busy the network is, that camera will send audio and video data, solely audio data, or else solely data characterizing the alarm such as data concerning the position of the camera.

On reception of those alarm signals, the server will decide to increase the priority of the data coming from the camera concerned in order to terminate the sending of data by the other cameras.

That system is not entirely satisfactory since it does not make it possible to take into account the simultaneous detection of alarms by two or more cameras.

This is because several cameras that have simultaneously detected an alarm risk mutual hindrance when transmitting video sequences to the server.

In addition, when the network is saturated, no mechanism is provided to remedy the lack of reception of the alarm signals by the server.

SUMMARY OF THE INVENTION

An object of the present invention is to overcome at least one of the aforementioned drawbacks by providing a method of analyzing at least one video sequence present on at least one sending apparatus in a communication network also comprising at least one receiving apparatus, wherein, the video sequence being compressed with an encoding method which generates a bitstream comprising information representing the temporal activity of the images of the video sequence and information representing the spatial activity of the images of that video sequence, and the temporal and spatial information being distributed between one or more spatio-temporal hierarchical levels, the method comprises the following steps performed at the receiving apparatus:

obtaining information representing the temporal activity of the video sequence present on the sending apparatus, analyzing the temporal information obtained, depending on the result of the analysis, deciding whether the generation of a request destined for the sending apparatus for the obtainment of information representing the spatial activity of the video sequence is necessary.

Another object of the invention is a device for analyzing at least one video sequence present on at least one sending apparatus in a communication network also comprising at least one receiving apparatus, wherein, the video sequence being compressed with an encoding method which generates a bitstream comprising information representing the temporal activity of the images of the video sequence and information representing the spatial activity of the images of that video sequence, and the temporal and spatial information being distributed between one or more spatio-temporal hierarchical levels, the device comprises at the receiving apparatus:

means for obtaining information representing the temporal activity of the video sequence present on the sending apparatus, means for analyzing the temporal information obtained, means for deciding whether the generation of a request destined for the sending apparatus for the obtainment of information representing the spatial activity of the video sequence is necessary, depending on the result of the analysis.

Thus by separating the information available at the sending apparatus into information representing the temporal activity of the sequence on the one hand, and into information representing the spatial activity of that sequence on the other hand, and by initially transmitting to the receiving apparatus only the temporal information, the latter are sufficient for the receiving apparatus to take a decision.

The information conveyed by the network is thus reduced with respect to that transmitted in the prior art, which makes it possible not to cause congestion of the network when several sending apparatuses simultaneously transmit such information.

Furthermore, the receiving apparatus which has an overall view of the network itself manages the alarm detections depending on the information received from the different sending apparatuses.

It may decide to obtain supplementary information from a sending apparatus, i.e. information on the spatial activity of a video sequence, depending on the temporal information received from the sending apparatus.

Thus, if the temporal information received shows significant movement in the video sequence at the sending apparatus, the receiving apparatus generates an appropriate request destined for the sending apparatus.

According to one feature, the step of analysis of the temporal information obtained comprises more particularly the steps of:

determining a temporal activity index of the video sequence on the basis of the information obtained, comparing the index determined with a predetermined first threshold index.

This analysis makes it possible to automatically detect the significant movements in the video sequence present at one or more sending apparatuses without a user needing to be involved to view any portion of video data whatsoever.

Depending on the result of the comparison between the index determined and the predetermined first threshold index, the decision to generate a request for obtaining information, from one or more sending apparatuses at which a significant movement has been detected, representing the spatial activity of the video sequence, is generated automatically.

According to one feature, the method according to the invention comprises a step of comparing the index determined with a predetermined second threshold index which may, for example, represent strong movement.

According to another feature, the method of encoding is a hybrid method of encoding based on the encoding of data blocks of an image and which generates a bitstream of video data in a plurality of spatio-temporal hierarchical levels.

Such a hierarchical organization of the compressed video sequence makes it possible to transmit one or more hierarchical levels to the receiving apparatus according to the needs expressed.

According to another feature, the first hierarchical level comprises header data and movement vectors of the blocks of the images of the video sequence.

Thus the information representing the temporal activity obtained at the receiving apparatus and on the basis of which a decision is taken as to whether or not to generate a request, is the movement vectors of that first hierarchical level.

According to another feature, the method comprises the following steps:

obtaining information representing the spatial activity of the video sequence present on the sending apparatus, analyzing the spatial information obtained, depending on the result of the analysis, deciding whether the generation of a request destined for the sending apparatus for the obtainment of supplementary information representing the spatial activity of the video sequence is necessary.

The information representing the spatial activity were obtained from the sending apparatus further to a decision to generate a request destined for the latter.

Here too, the decision to generate another request destined for the sending apparatus for obtaining supplementary information representing the spatial activity of the video sequence is made automatically after analysis of the spatial information obtained.

The analysis of the spatial information obtained is moreover also made automatically in order to not to make human involvement necessary.

It will furthermore be noted that the transmission of solely the information representing the spatial activity of the video sequence by the sending apparatus uses a small part of the bandwidth available on the network, which makes it possible to simultaneously transmit such information from other sending apparatuses to the receiving apparatus without causing congestion of the network.

According to one feature, the analysis of the spatial information obtained comprises more particularly the steps of:

determining a spatial activity index of the video sequence on the basis of the spatial information obtained, comparing the index determined with a predetermined threshold index.

This analysis makes it possible to automatically determine whether the spatial activity of the video sequence present at one or more sending apparatuses is high or low, without a user needing to be involved to view any portion of video data whatsoever.

Depending on the result of the aforementioned comparison, the decision to generate a request for obtaining supplementary information, from one or more sending apparatuses at which a significant movement has been detected, representing the spatial activity of the video sequence, is generated automatically.

According to another feature, the method further comprises a step of deciding whether the generation of a request destined for the sending apparatus for obtaining supplementary temporal information is necessary depending on the result of the analysis performed on the temporal and/or spatial information obtained.

Here too, the decision to generate a request is taken automatically depending on the result of the analysis, which enables the user not to have to be intervene.

According to one feature, the decision step takes into account the calculation capacity of the receiving apparatus.

When the invention is implemented in a local home network, it is indeed important not to transmit too high a volume of data to the receiving apparatus which might not be possible to process given its relatively limited calculation capacity.

According to another feature, the decision step takes into account the bandwidth available on the network.

Thus account is automatically taken of the risks of causing congestion of the network when the question is asked as to the necessity of having recourse to supplementary information.

According to one feature, when temporal and spatial information has been obtained from a plurality of sending apparatuses and a decision for obtaining supplementary temporal and/or spatial information from at least one of them has been deemed necessary, the method comprises a step of classifying each sending apparatus with respect to the other apparatuses, depending on the temporal information and spatial information obtained from that apparatus.

This classification enables the most relevant apparatuses in terms of spatial and temporal activity to be detected According to another feature, the set of sending apparatuses are represented in two Vitterbi type trellises, one dedicated to the temporal activity and the other to the spatial activity, and in each of which each apparatus is represented along the x-axis and, according to the trellis concerned, each spatial or temporal hierarchical level obtained and/or to be obtained is represented along the y-axis.

The representation of the different apparatuses in a Vitterbi type trellis is advantageous in that it enables simple implementation of known algorithms for searching for paths between the apparatuses.

According to one feature, the method comprises, for each trellis, a step of determining an optimum path between the apparatuses by only taking into account, for each of them, the highest spatial or temporal hierarchical level.

Such a path is optimum in the sense that it makes it possible to obtain from each of the sending apparatuses the highest spatial or temporal hierarchical level.

Nevertheless, such a path does not take into account the calculation capacity of the receiving apparatus, nor even the bandwidth available on the network.

According to another feature, the method comprises, for each trellis, a step of determining one or more alternative paths between the apparatuses by performing, for a given trellis, the following operations which are reiterated in order to determine a plurality of alternative paths:

going through the trellis considered, deleting, according to the trellis considered, the highest spatial or temporal hierarchical level obtained and/or to be obtained for the sending apparatus having, as may be the case, the least spatial activity or temporal activity and having at least two hierarchical levels of information, so leading to the determination of an alternative path to which the aforementioned apparatus contributes for a reduced spatial and/or temporal hierarchical level.

One or more alternative paths are thus determined for each trellis by going through the trellis and deleting on each occasion of going through one hierarchical level for a single one of the sending apparatuses. The next time the trellis considered is gone through, one hierarchical level of another sending apparatus is deleted.

According to one feature, the method comprises a step of associating a decoding cost with each alternative path determined, the decoding cost associated with a path corresponding to the estimation of the calculations necessary to perform the decoding of encoded spatial and/or temporal information coming from the different sending apparatuses placed on the path.

In this manner the decoding cost is evaluated of each alternative path determined for each of the trellises dedicated to the temporal activity and to the spatial activity.

According to another feature, the method comprises a step of selecting the optimum path by determining among all the paths the one for which the decoding cost is the closest to the calculation capacity of the receiving apparatus, while remaining less than that capacity.

The selection of the aforementioned optimum path thus makes it possible to take into account, when supplementary information is requested, of the calculation capacity of the receiving apparatus, this taking in account being done automatically, that is to say without a user having to be involved in the selection.

According to one feature, the method comprises a step of selecting the optimum path by determining among all the paths the one for which the rate induced is less than the bandwidth available on the network.

The invention also relates to a communication apparatus comprising a device as succinctly described above.

According to another aspect, the invention also relates to:
a means for storing information, which information can be read by a computer or a microprocessor containing code instructions of a computer program for executing the steps of the method according to the invention as for the one briefly disclosed above, and
a partially or totally removable means for storing information which information can be read by a computer or a microprocessor containing code instructions of a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method of the invention as briefly set out above, when said computer program is loaded and executed by the programmable apparatus.

As the features and advantages relating to the device, to the communication apparatus comprising such a device, to the information storage means and to the computer program are the same as those disclosed above concerning the method according to the invention, they will not be repeated here.

BRIEF DESCRIPTION OF THE DRAWINGS

Other features and advantages will appear in the following description, which is given only by way of non-limiting example and made with reference to the accompanying drawings, in which:

FIG. 2*a* is a detailed diagrammatic view of a sending apparatus represented in FIG. 1;

FIG. 2*b* is a detailed diagrammatic view of the receiving apparatus represented in FIG. 1;

FIGS. 5*a*1 and 5*a*2 illustrate a schema for hybrid video encoding based on the encoding of data blocks of the images of a video sequence according to a plurality of hierarchical levels of the data;

DETAILED DESCRIPTION OF THE PREFERRED EMBODIMENTS

Figure 1:
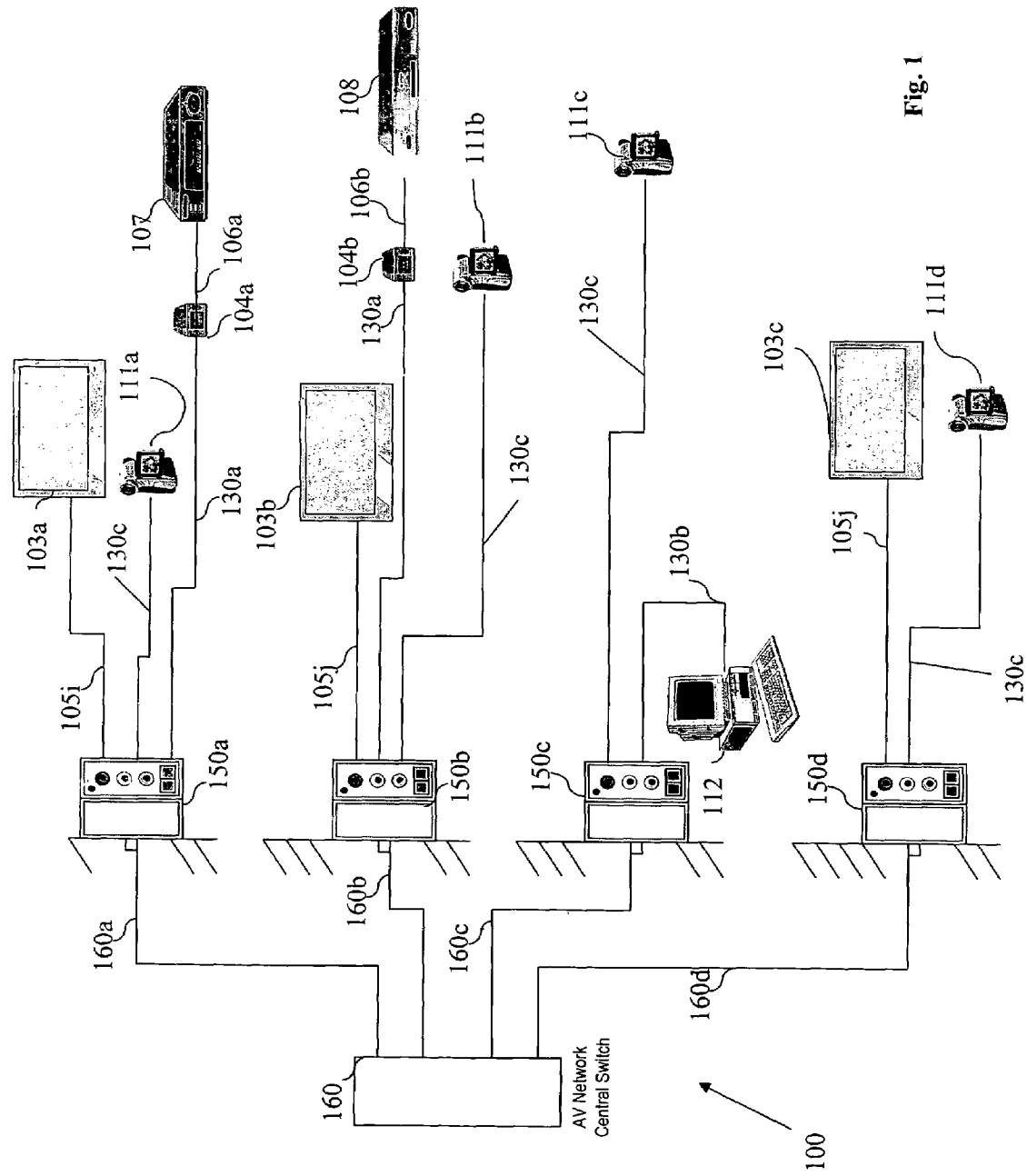
FIG. 1 is a diagrammatic view of a communication network implementing a plurality of sending apparatuses connected to a receiving apparatus via the network according to the invention.

FIG. 1 represents a multimedia communication network referenced 100 in which the invention is advantageously implemented. This network may for example be installed in a domestic environment and is not dedicated specifically to video surveillance.

This multimedia communication network interconnects items of equipment such as televisions referenced 103*a*, 103*b* and 103*c*, a video recorder referenced 107, a reader of DVD type referenced 108.

The network comprises several video surveillance apparatuses (communication apparatuses sending video data) 111*a*, 111*b*, 111*c* and 111*d*, each comprising a camera and a compression unit, interconnected by the network to a central computer (receiving communication apparatus) 112.

Each apparatus may, for example, be installed in one of the rooms of the home.

This network comprises items of equipment having a multimedia interface, which may, for example, be integrated into compartments and referenced 150*a*, 150*b*, 150*c* and 150*d*. These items of equipment having a multimedia interface are connected to a central switching unit 160 preferably located beside the electric power distribution board.

The item of multimedia interface equipment 150*a* is connected via an analog video link 105*i* to the television 103*a*. According to one variant, the link 105*i* may be in accordance with the IEEE1394 standard and the television then comprises an IEEE1394 card.

The item of multimedia interface equipment 150*a* is also connected via a link 130*a* in accordance with the IEEE1394 standard to an analog to digital converter 104*a*, itself connected to the video recorder 107 via a link 106*a*.

The analog televisions 103*b* and 103*c* are respectively connected to the items of multimedia interface equipment 150*b* and 150*d* by a link 105*i*, 105*j*, in identical manner to the link 105*i* connecting the analog television 103*a* and the item of multimedia interface equipment 150*a*.

The item of multimedia interface equipment 150*b* is connected by a link of IEEE 1394 type, denoted 130*a*, to an analog to digital converter 104*b* which will convert the analog video information generated by the DVD reader 108 into a format compatible with the IEEE1394 standard. The DVD reader 108 is connected to the analog to digital converter 104*b* by an analog link 106*b* comprising connectors of RCA type.

The computer 112 is connected to the item of multimedia interface equipment 150c by a link of IEEE 1394 type, denoted 130b.

The video surveillance apparatuses 111a, 111b, 111c and 111d are respectively connected to the items of multimedia interface equipment 150a, 150b, 150c and 150d by a link of IEEE 1394 type, denoted 130c.

It should be noted that each of the items of multimedia interface equipment described previously comprises at least the connection means of the Ethernet and IEEE1394 type and at least one analog video output.

These items of multimedia interface equipment are respectively connected to the switching unit 160 via a single cable of UTP CAT 5 type denoted 160a, 160b, 160c and 160d.

The items of multimedia interface equipment are preferably in conformity with the standard IEEE1394.1 ("P1394.1, Draft Standard for High-Performance Serial Bus Bridges", Oct. 24, 2002) enabling the communication of multimedia entities via a serial bus network of IEEE1394 type.

With reference to FIG. 2a a description will now be given of one sending apparatus among those denoted 111a, 111b, 111c, 111d in FIG. 1 and, with reference to FIG. 2b, the receiving apparatus 112 of FIG. 1.

Each room of the home will be provided with a sending apparatus comprising a fixed camera capable of taking images through a wide angle. This camera, denoted 170 in FIG. 2a, will be constituted by a lens receiving the visual information, a CCD sensor on which the visual information is formed, a gain-controlled amplifier amplifying the signal coming from the CCD sensor and an analog to digital converter making the amplified signal digital in YUV color format and in CIF spatial format.

An exposure interval will be chosen, by way of example, that is compatible with a sequence of 30 images/second.

The camera will be coupled to a compression module 172 which comprises a compression unit and a unit for transmission/reception of digital data 182 over the network.

The transmission/reception unit is, by way of example, an IEEE1394 card.

The compression unit is constituted by a calculation unit 174, by a temporary storage unit (RAM memory) 176, by a control unit 178 and by a hard disk 180.

As shown in FIG. 2b, the receiving apparatus, which is, by way of example, in the form of a central computer 112, is constituted, by way of example, by a calculation unit 192, by a temporary storage unit (RAM memory) 194, by a hard disk 196, by a long duration storage unit (such as a magnetic tape system or a hard disk of very high capacity) 198, by a screen 200, by a unit for transmission/reception of digital data 202, by a keyboard and mouse combination 204 and by a control unit 206. The transmission/reception is, by way of example, an IEEE1394 card.

It should be noted that the central computer may be replaced by a unit comprising a calculation unit, a temporary storage unit (RAM memory), a hard disk and a unit for transmission/reception of digital data. In this case, it is nevertheless assumed that a screen having an IEEE1394 card is available on the network. In case of alarm, the visual information will be viewed on that screen via the network.

It will be noted that the receiving apparatus 112 comprises all the means necessary for the implementation of the invention and which are, by way of example, constituted at least in part in the form of a computer program stored on one of the storage means of the apparatus and which is executed by the calculation unit.

In order to enable the central computer to receive and analyze the different information coming from the sending apparatuses, it is necessary to set up communication between the latter and the central computer and it is necessary for the central computer first of all to have knowledge of the apparatuses present on the network.

To do this, the central computer may, for example, provide the user with a configuration interface enabling him to enter information relating to the sending apparatuses which he has connected to the home network, in particular their unique identifier also called EUI64. By virtue of this identifier, the central computer may, by means of a DEP ("Discovery and Enumeration Protocol") message as described in the standard IEEE1394.1 ("P1394.1, Draft Standard for High-Performance Serial Bus Bridges", Oct. 24, 2002) and called an EUI64 discovery request, obtain the addressing means of the camera identified by its EUI64, as defined in the IEEE1394 standards.

It is also conceivable for the central computer to utilize a DEP message called a keyword discovery request. This message enables the central computer to produce a request destined for all the apparatuses connected to the network in order to for them to identify themselves with respect to keywords, as described in the standard IEEE1212 (IEEE1212 Std.—2001, Standard for Control and Status Registers Architecture for microcomputer buses) and supplied in the DEP message (keyword discovery request).

A keyword may be, for example, the word camera.

The apparatuses replying to this request will thus form part of the list of the cameras to which the central computer must be connected, it being possible to confirm and refine this list by going through their ROM configurations (as defined in the standards IEEE1394 and IEEE1212). Other types of equipment discovery are possible, in particular by going through the ROM configurations of the apparatuses connected to the network, it being possible for this purpose for the items of multimedia interface equipment 150a to 150d of FIG. 1 to integrate a proxy functionality.

Once the central computer has obtained the addresses of the cameras (sending apparatuses), as defined by the IEEE1394 standards, it can control them using dedicated registers accessible by means of transactions of Read, Write & Lock type, which are identified by the standards IEEE1394 and IEEE1212.

The central computer may thus request the sending apparatuses to begin to send temporal information (information linked to the image headers and to the movement vectors of the video sequence considered). This information will pass from the sending apparatuses to the central computer preferably using asynchronous transactions of Write type, the asynchronous transaction in the standard IEEE1394 enabling the integrity of the data transmitted to be ensured.

Once the central computer has identified the need to obtain a stream of images from sending apparatuses, it will set up an isochronous connection from the sending apparatuses to itself. the isochronous transaction in the standard IEEE1394 makes it possible to ensure the speed of the data transmitted, which is appropriate for the transfer of audio-video data. Setting up an isochronous connection is performed according to a message exchange protocol named JOIN, LISTEN, RENEW & STREAM STATUS which are defined in the standard IEEE1394.1. The termination of an isochronous connection is carried out according to a message exchange protocol LEAVE & STREAM STATUS defined in the standard IEEE1394.1.

In the embodiment described, a video encoding standard is used which is the H.263 version 2 standard defined in the document entitled "Draft text of recommendation H.263 version 2 (H.263+) for decision" by Gary Sullivan, technical report ITU-T, DRAFT 21, February 1998. However, other equivalent video encoding standards may also be used such as the MPEG-4 standard.

The H.263 standard may be classified in the group of the hybrid methods of video encoding which rely on the encoding of square portions of an image termed blocks. This standard defines a basic syntax to which is added a certain number of optional modes having different objectives.

Among these optional modes, a certain number of them are destined to make the bitstream more resistant.

Other modes such as scalablility have been developed with the object of increasing the efficiency of the video transmission systems in the case of simultaneous transmission to a plurality of users having different capacities of reception and decoding.

Scalability gives a hierarchical structure in the bitstream, each level of the stream corresponding to an increment level of temporal and/or spatial information.

FIGS. 5a1 and 5a2 which will be described later represent a hybrid predictive video encoding schema with movement compensation based on data blocks of the images of a video sequence to be compressed and encoding by transformation.

It will be noted that each image of a sequence is divided into data blocks of fixed size (in general 8*8 pixels) and that each block is then processed more or less independently.

The designation "hybrid" means that each block is encoded with a combination of movement compensation and encoding by transformation.

Thus, a block is initially predicted on the basis of a block of a preceding image.

Movement estimation is the term used for the estimation of the position of the block that is visually the closest to the current block in the reference image.

The displacement between the reference block and the current block is represented by a movement vector.

Movement compensation consists of predicting the current block from the reference block and from the movement vector. The error of prediction between the original block and the predicted block is encoded with a transformation of DCT (Discrete Cosine Transform) type, quantized and converted into the form of binary codewords using codes denoted VLC (Variable Length Codes).

The role of the movement compensation is to utilize the temporal correlations between successive images of the video sequence to increase the compression.

The role of the DCT is to reduce the spatial correlations in the error blocks.

After the operations of DCT encoding and quantization, a majority of the high frequencies is reduced to 0. The human visual system having low sensitivity to high spatial frequencies, the impact of such encoding on visual appearance remains low.

The DCT coefficients are gone through in a zig-zag from the low frequencies to the high frequencies to constitute a first bitstream. The presence in this bitstream of numerous zeros is taken advantage of by a variable length code, which is generally, and in known manner, implemented by an encoder using runlength coding, to reduce its size.

Up to that point it was assumed that the temporal prediction was effective and that the rate generated by the prediction error remained less than that of the original block encoded without movement compensation. This mode of encoding is generally termed P mode or INTER mode. In certain cases, the cost of error prediction is too high and a DCT and encoding utilizing an encoder by runlength encoding are then directly applied to the block. This encoding mode is termed INTRA mode.

In practice, the movement compensation is very often applied to a set of blocks termed macroblock (MB) whereas the DCT is applied to a block. The most common video encoders use MBs of size 16*16. The movement vectors of adjacent MBs being most often close, they may be predictively encoded with respect to the MBs already encoded.

An image may be entirely encoded in INTRA mode and is then called an INTRA image. This type of encoding is used for the first image of the sequence, but also to limit the propagation of prediction error and losses, or to enable functionalities such as random access, fast forward or rewind, etc. The number of INTRA images is nevertheless limited to obtain better compression rates.

The majority of the images of a video sequence are thus encoded in P mode. It is however not forbidden to insert INTRA MBs in a P image. In the embodiment described, 1 image out of 15 of the basic level will be encoded in INTRA mode.

The DP ("Data Partitionning") mode described in the document "Draft for "H.263++" Annexes U, V and W to recommendation. http://standard.pictel.com/ftp/video-site/hé-"plusplus/H.263pp WhiteContribution—r2.doc" is an effective mechanism for rendering binary data streams robust. It makes it possible to separate the segments of a bitstream as a function of their importance. External mechanisms, such as error corrector codes, will make it possible to better protect or to favor the transport of the most important data.

Figure 3A:
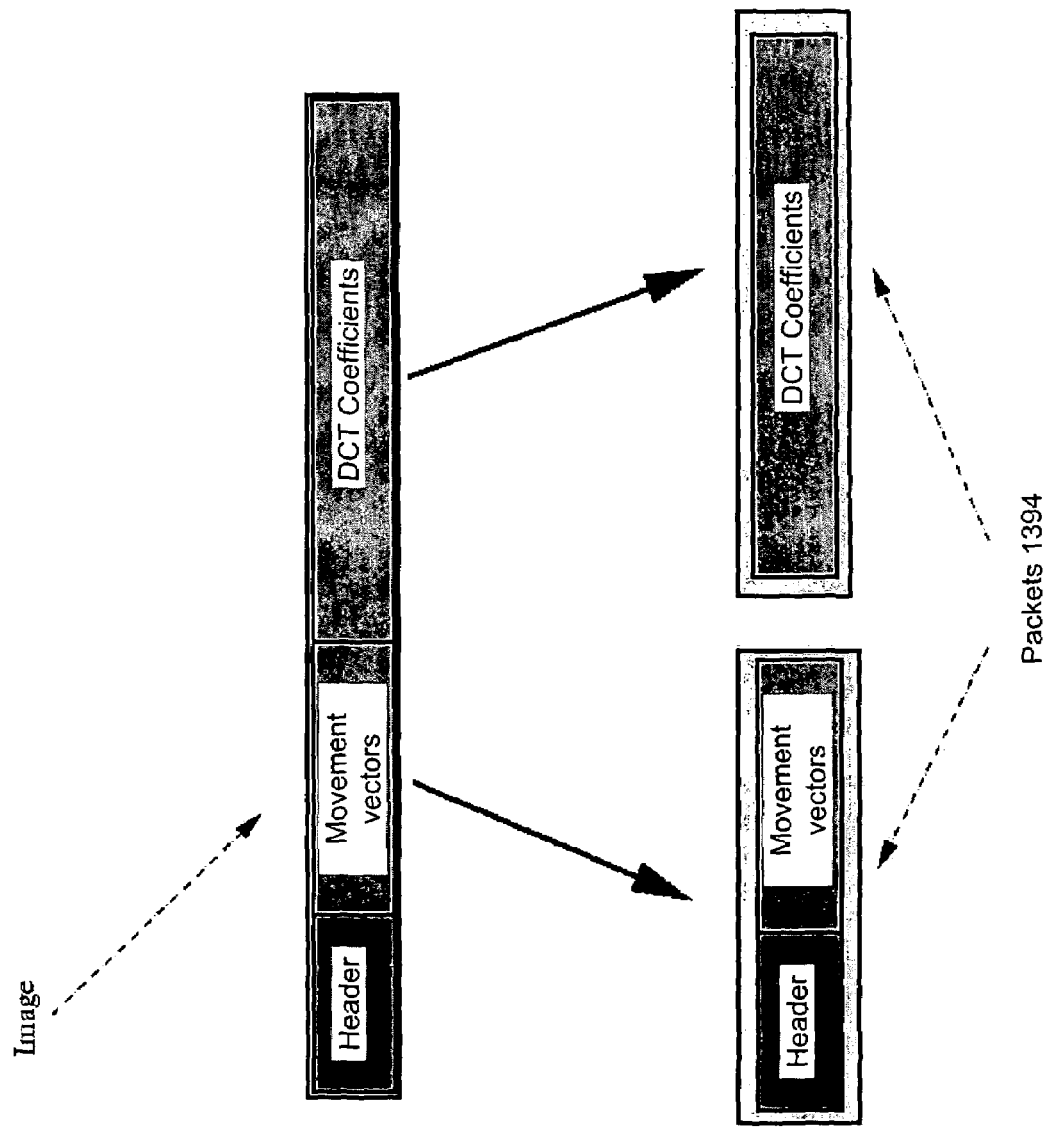
FIG. 3*a* illustrates the partitioning of the video data and the encapsulation of those data in data packets in accordance with the IEEE1394 standard.

The headers, the movement vectors and the DCT coefficients of successive MBs are no longer interlaced in the bitstream following the order of traversing the image, but are grouped into different portions of stream (this organization is represented in the upper part of FIG. 3a).

The headers and the movement vectors are encoded with reversible variable length codes (RVLC) while the DCT coefficients of lesser importance are encoded with VLC codes.

This encoding mode will be used for the encoding of the images of the basic level of the bitstream.

Indeed, the headers and the movement vectors will be separated from the rest of the data coming from an image and these two portions of bitstream constituted in this manner will be encapsulated in different data packets in accordance with the standard IEEE1394, as indicated in the lower part of FIG. 3a.

In normal operation (no alarm), only the packets containing the movement vectors will be transmitted to the central computer 112 of FIGS. 1 and 2b (receiving apparatus).

As stated above, the basic level (L1) of the bitstream of a video sequence which has been compressed with a hydric encoding method rely on the encoding of data blocks is solely composed of INTRA images denoted I and of P images. The quality of this level may be improved both temporally and spatially by using the different modes of scalability defined in the standard H.263+, i.e. spatial scalability, temporal scalability and SNR scalability (signal to noise ratio scalability). In what follows, temporal and spatial scalability are used.

The temporal scalability is achieved by using predicted images bidirectionally. The images generated by this mode are termed B images. The use of these images makes it possible to increase the efficiency of compression with respect to the P images. No image can be predicted from B images, which makes it possible to withdraw them from a bitstream without the risk that the following images will be affected.

Figure 3B:
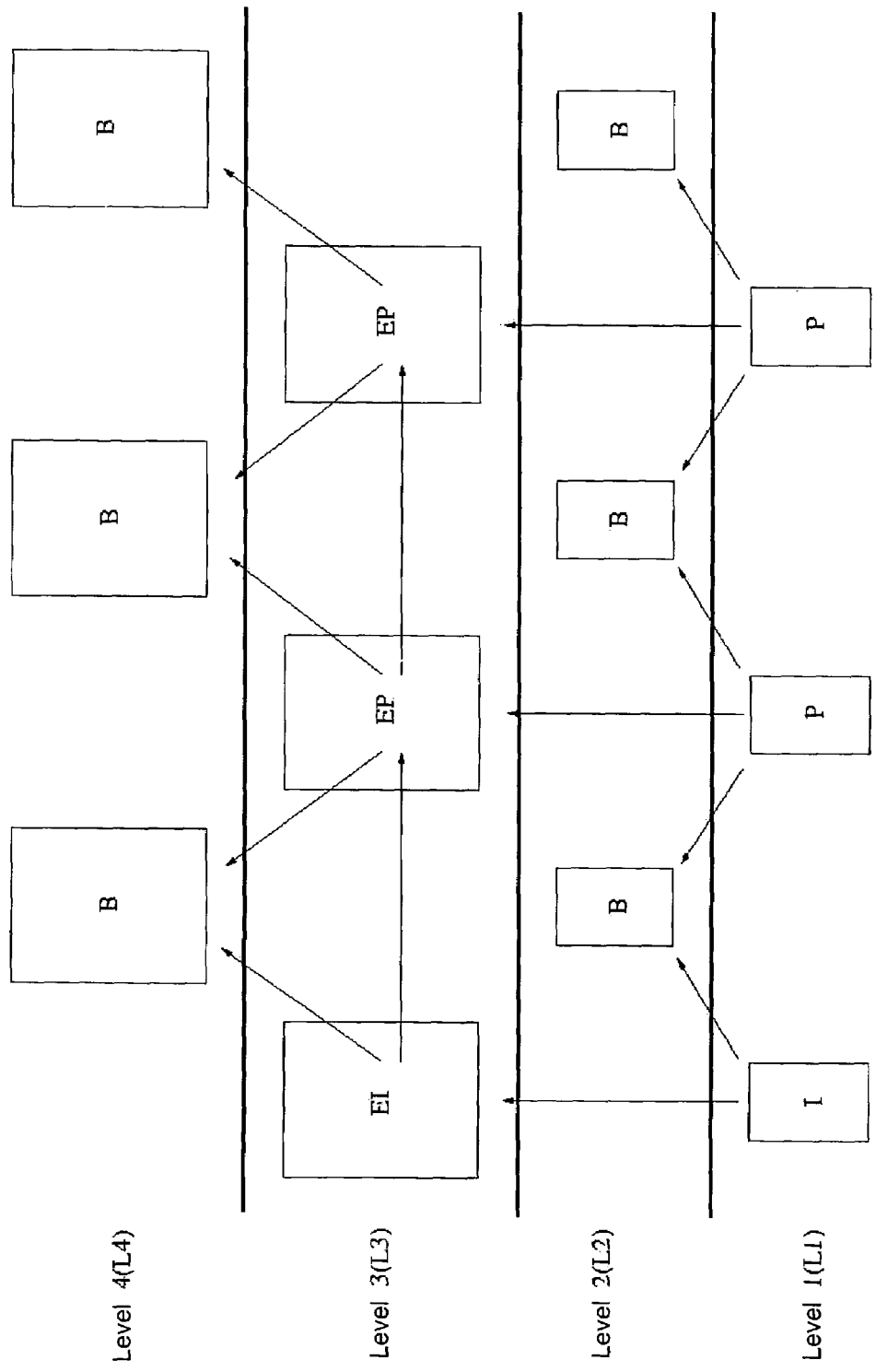
FIG. 3*b* is a diagram of four hierarchical levels of spatial and/or temporal scalability of the H.263 version 2 standard

FIG. 3b illustrates the manner in which the level of temporal scalability 2 (L2) is predicted on the basis of the basic level 1 (L1).

The format of a B image (height*length) is still equal to that of its reference images.

A MB of a B image can be encoded in forward mode, backward mode, and bidirectionally.

It should be noted that INTRA MBs are also found in the B images but this mode will not be used in what follows.

Forward mode is identical to INTER mode, backward mode is an INTER mode inversed temporally and the bidirectional mode is a combination of the forward and backward modes.

In this last case, two movement predictions are implemented on the basis of the two images bounding the image to be encoded. Each MB encoded in bidirectional mode is thus associated with two movement vectors. At the time of reconstruction, an average of the two MBs serving for prediction is calculated by adding the pixel values then by dividing that sum by two. It may thus be noted that the two images serving for the prediction must be encoded before the image B making reference thereto. To the predicted MBs, a prediction error could be added or not, calculated exactly as in INTER mode.

Furthermore, the VLC encoding of the movement vectors and the DCT coefficients is carried out as for the INTER MBs and re-uses the same tables.

The choice of the encoding mode of a MB is made by a control unit of the type of that of unit 178 of FIG. 2a. The control unit tests each possible encoding mode and follows the mode which will make it possible to minimize the difference between the predicted MB and the original MB. In the description that follows, it will, by way of example, always be chosen to encode the prediction error.

The spatial scalability consists of improving the quality of a lower level (L1 or L2 in FIG. 3b) by adding spatial information to it. In general, this mode assumes that the basic level L1 has not been encoded at the resolution of the original sequence, but has rather undergone subsampling in order to divide its resolution by four (division by two of the horizontal and vertical resolutions).

The encoding of an image at a level of spatial improvement then commences with an interpolation of an image of the basic level in order to get back to the initial resolution. The method of interpolation is described in Annex 0 of the document defining the H.263+ standard which was cited above.

Next the difference is calculated between this image and the original image of the same size. Next, several encoding modes may be used for the MBs of the improvement image: the upward, forward and bidirectional modes.

The upward mode consists of encoding the difference by using the same methods as for an INTRA image. However, the quantization parameter used for the improvement level is in general less than that of the basic level, which ensures that in addition to an improvement of the spatial resolution, the quality is improved.

It will be noted that an image only containing upward MBs is said to be EI ("Enhancement INTRA"). It will be assumed here that all the INTRA images will be improved by an EI image (level L3 in FIG. 3b).

Forward mode is based on temporal prediction.

An image containing a combination of forward and upward MBs is said to be EP.

The encoding of an EP image also commences with an interpolation of the image of the basic level and a difference between the original image and the interpolated image is calculated.

Two reference images will thus be stored: the interpolated basic level image and the image of the preceding spatial improvement level (EI or EP at level L3 in FIG. 3b).

This last image is used to carry out a movement estimation in the current image. A movement vector is then obtained for each MB of the current image. After movement compensation of the reference image, for each MB the upward and forward modes are compared and the mode which enables the difference between the original MB and the predicted MB to be minimized is adopted.

Thus, the compression module 172 of the sending apparatus of FIG. 2a (apparatuses 111a-d of FIG. 1) compresses the data according to the H.263 version 2 standard and the data will be encoded in scalable format with four levels of scalability L1, L2, L3, L4 as represented in FIG. 3b.

The basic level is encoded at 15 images/second with an image I every 15 images, the rest of the images being encoded in P mode. This level L1 encoded using the "data-partitioning" mode of Annex V of the H.263 version 2 standard. In this mode, separation is thus made in an image of, on the one hand, the header data and the movement vectors, and on the other hand, the DCT data (FIG. 3a), which facilitates the access to the header data and to the movement vectors.

Level 2 (L2) is a level of temporal improvement only containing B images. This level, when it is associated with level 1, doubles its temporal frequency.

Level 3 (L3) is a level of spatial improvement. It makes an EI (respectively EP) image correspond with each image I (respectively P) of the basic level.

Level 4 (L4) inserts B images between the images coming from levels L1 and L3.

Figure 4:
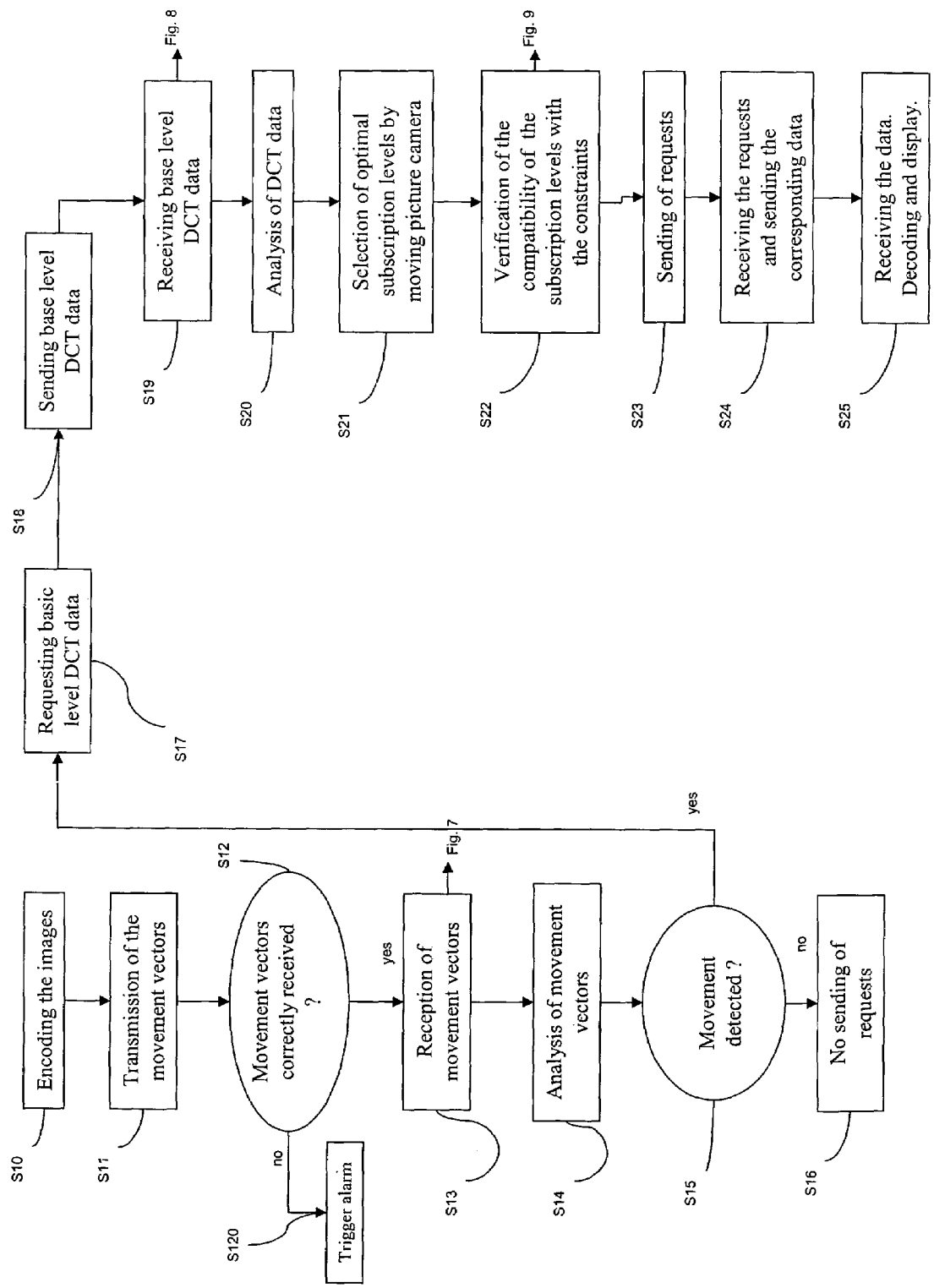
FIG. 4 illustrates an algorithm for implementation of the method according to the invention.

With reference to FIG. 4 a description will now be given of the method according to the invention of analyzing several video sequences present at sending apparatuses S1, S2, S3, S4, S5, S6 considered as sources of video data.

These apparatuses are, by way of example, of the type of those represented in FIG. 1 and denoted 111a, 111b, 111c and 111d (video surveillance cameras) and of the one represented in FIG. 2a.

FIG. 4 illustrates an algorithm comprising different instructions or portions of software code corresponding to steps of the method according to the invention.

The computer program which is based on this algorithm is stored, in part, in the sending apparatus of FIG. 2a, and in part in the receiving apparatus 112 (central computer) of FIG. 2b.

The execution of this computer program thus enables the method according to the invention to be performed.

The algorithm of FIG. 4 commences with a first step S10 during which the compression of a video sequence is carried out.

This step is performed by the sending apparatus of FIG. 2a at which the video sequence is present.

With reference to FIGS. 5a1, 5a2, 5b, and 5c the compression process will now be described, and, with reference to FIG. 6, the decompression process.

As set out above, FIGS. 5a1 and 5a2 illustrate a schema for hybrid predictive video encoding which is applied to the images of the video sequence by the compression module 172 of FIG. 2a and, more particularly, by the calculation unit 174.

The encoding of a video sequence commences at step S98 by the reception of an image of a video signal in YUV format at a speed of 30 images per second. This video signal may, as in the preferred embodiment of the invention, come from the camera 170 or from the storage unit 180 of FIG. 2a.

It will be assumed that each image is numbered.

Step S98 is followed by step S99 which tests whether the number of the current image is a multiple of 2.

If this is the case, step S99 is followed by step S100 (FIG. 5a2) during which a subsampling by four is performed on the original image. The images thus subsampled will serve as original images for the encoding of the basic level (L1).

The first image of a sequence being systematically encoded in INTRA mode, step S100 is followed directly by step S101.

During this step, the cutting up of the image into data blocks of size 8*8 pixels is performed. Each block then undergoes a discrete cosine transform (DCT) according to the method described in the article "*Fast Algorithms for the Discrete Cosine Transform*", E. Feig and S. Winograd, *IEEE Trans. On Signal Proc.*, vol. 40, No. 9, September 1992. The 64 DCT coefficients of a block are then stored in a table denoted coeff in the temporary storage unit 176 of FIG. 2*a*.

Figure 5B:
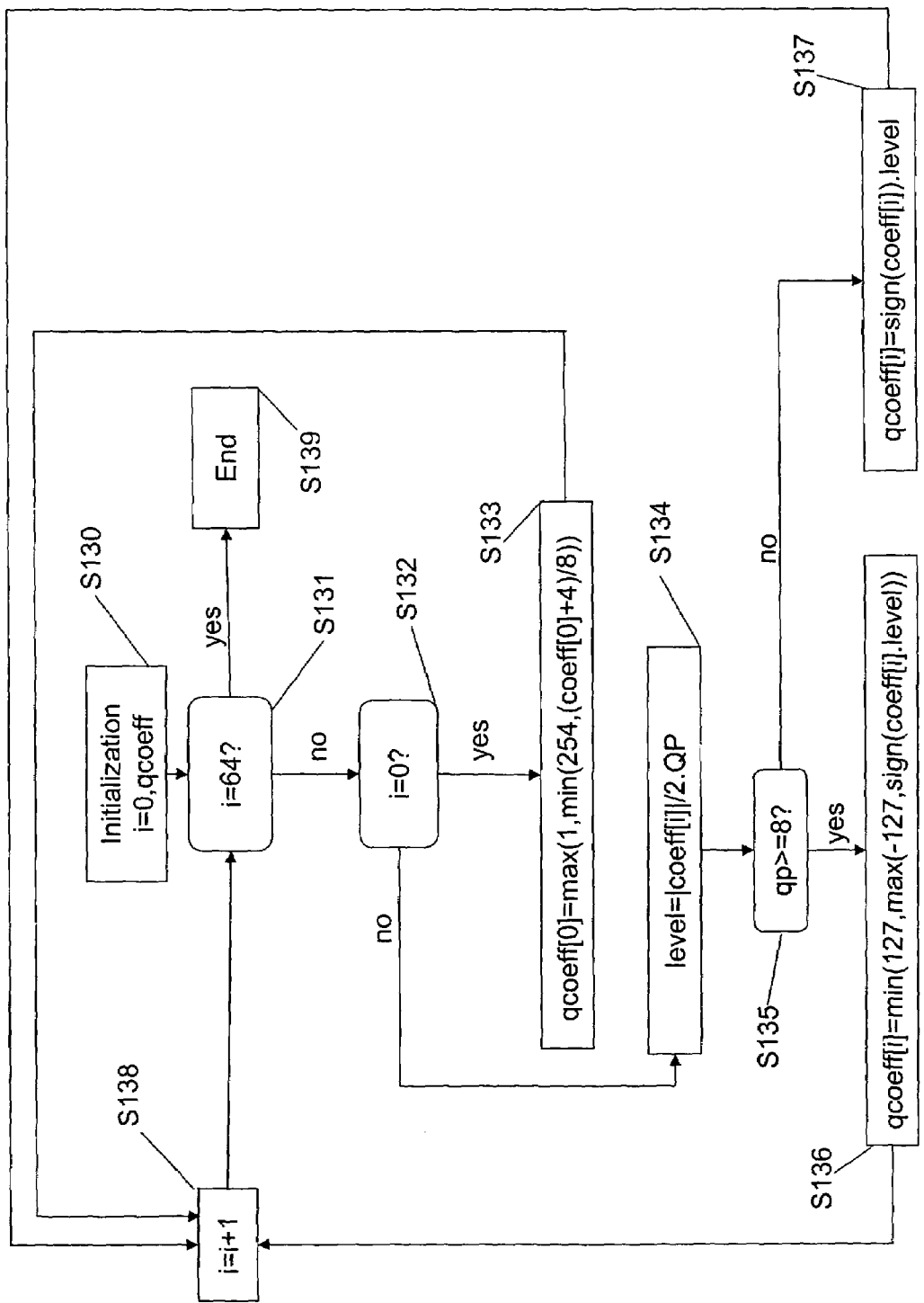
FIG. 5*b* is an algorithm representing the operations of quantization of the INTRA macroblocks according to the H.263 version 2 standard.

Step S101 is followed by the step S102 during which the quantization is performed of the DCT coefficients of the blocks obtained at the preceding step. The quantization process applied in the standard H.263 version 2 for INTRA blocks is represented by the algorithm of FIG. 5*b*, the description of which follows.

This quantization process commences at step S130 by the initialization of the variable i to 0 and by the creation of a table qcoeff to receive the quantized DCT coefficients. These two variables are stored in a storage unit 176 of FIG. 2*a*.

Step S130 is then followed by step S131 at which the value of i is tested.

If i is equal to 64, the step S139 is proceeded to at which the quantization process is terminated.

In the opposite case, step S131 is followed by the step S132 during which the value of i is again tested.

If i=0 (this value indicates that processing is being performed of the low frequency coefficient DC), step S132 is followed by the step S133 where qcoeff takes the value qcoeff [0]=max(1,min(254,(coeff[0]+4)/8)).

Note that max(a,b) indicates that the maximum value between a and b is kept, min(a,b) indicates that the minimum value is kept, and sign(a) indicates that the sign of a is taken.

Step S133 is then followed by step S138.

If, on the contrary, at step S132 i is different from 0, that step is followed by the step S134 during which a variable level is created in the temporary storage unit 176 taking the value coeff[i]/(2.QP).

QP represents the quantization parameter allocated to the block and which may be fixed for the image or variable. It will be assumed that QP is fixed for each level of scalability and is thus the same for each block of each image of the same level. QP is, by way of example, fixed to 13 for the basic level.

Step S134 is followed by step S135 during which the value of QP is tested.

If QP is less than 8, qcoeff is calculated according to the formula given at step S137, i.e. qcoeff[i]=sign(coeff[i].level).

Otherwise, qcoeff is calculated using the formula given at step S136, i.e. qcoeff[i]=min(127,max(−127,sign(coeff[i].level)).

As soon as it has been used, the variable level is deleted from the temporary storage unit 176 of FIG. 2*a*. These last two steps are followed by step S138 during which the variable i is incremented by one unit and that step is followed by step S131 already described above.

Returning to FIG. 5*a*2, step S102 is followed by step S103 during which the quantized coefficients, put in binary form beforehand, are gone through in zig-zag. The bitstream of each block is then encoded independently by the variable length encoder. The zig-zag path and the VLC encoding will, by way of example, adopt the methods described in the document entitled "*Information technology—Generic coding of audio-visual objects=part*2: *visual, ISO/IEC JTC* 1/*SC* 29/*WG*11 *N*3056, December 1999". When all the blocks of the image have been processed, the bitstream obtained by the encoding of the coefficients is concatenated with the other encoding information of the current image (H.263 version 2 header information) and with the information from the preceding images. The encoding of the INTRA image terminates at this step.

The following steps describe the reconstruction of a MB which is in fact necessary in predictive encoding when an image will serve as reference for the following image.

It will be noted that the images are reconstructed in the same manner that the decoder receives them.

Step S102 is also followed by step S104 during which the inverse quantization of the current image is carried out.

This step is followed by step S105 during which the inverse discrete cosine transform of the dequantized coefficients is performed. These last two processes will be described later at the time of the description of the decoding process.

For an INTRA image, the image so reconstructed is directly stored in the temporary storage unit 176 of FIG. 2*a*, as represented in step S106, with a view to the encoding of the following images.

As previously indicated, the images of the basic bitstream may be encoded either in INTRA mode, or in P mode.

The encoding in P mode commences with the arrival of a new image in YUV format at step S100.

Initially, this image is sent to a movement estimator (step S107). During this step, the image is divided into MBs of size 16*16 and each MB is then processed successively.

Step S107 applies a conventional method of movement estimation by comparison of the MBs of the current image with those of the preceding image. The algorithms used are based on the simplifying hypothesis that the pixels of the same MB have the same movement imparted to them. The movement vector of a MB of a current image is then obtained by finding the MB with the greatest resemblance in the previous image (reference image) in a pre-selected search window. By default, the search window defined by the standard H.263 version 2 corresponds to the entire image. As for the reference image, this is the image stored in unit 176 at step S106.

If the size of search influences the time for calculating the movement estimation, the major problem of the movement estimation by comparison of the MBs remains the determination of the distance. By way of example, use will be made of the movement estimation method described in the document entitled "*In-line Movement Estimation*", by L. Difdier, R. Kamdem, LIM University of Provence, December '1996.

A movement vector with two components of translational movement is thus obtained and the two components are encoded using a VLC at step S103 using the table given in the standard H.263+ cited above.

The coefficients thus obtained are stored in the storage unit 176 of FIG. 2*a* for them to be concatenated with the other encoding information of the current image.

Step S107 is then followed by step S108 during which the movement compensation of the current MB is carried out. During this step, each MB of the image is translated with the movement indicated by its movement vector. The movement compensated image is stored in unit 176.

Next the comparison is made of the image obtained with respect to the original image by calculating the different between the two images (step S109). The difference image is stored in unit 176.

The encoding mode is chosen depending on the activity of the MB by the control unit 178 at step S110. This activity is, by way of example, measured by the difference between the current MB and the predicted MB. If the difference is greater than a threshold, the MB is encoded in INTRA mode and will be encoded in INTER mode in the opposite case.

If the MB is encoded in INTRA mode, the encoding is performed according to the process described previously.

If the MB is encoded in INTER mode, steps S109 and S110 are followed by the step S101. During this step, a discrete cosine transform is applied to the blocks of each MB of the difference image to be encoded in INTER mode. The DCT coefficients obtained are stored in the storage unit 176 in a table coeff.

Figure 5C:
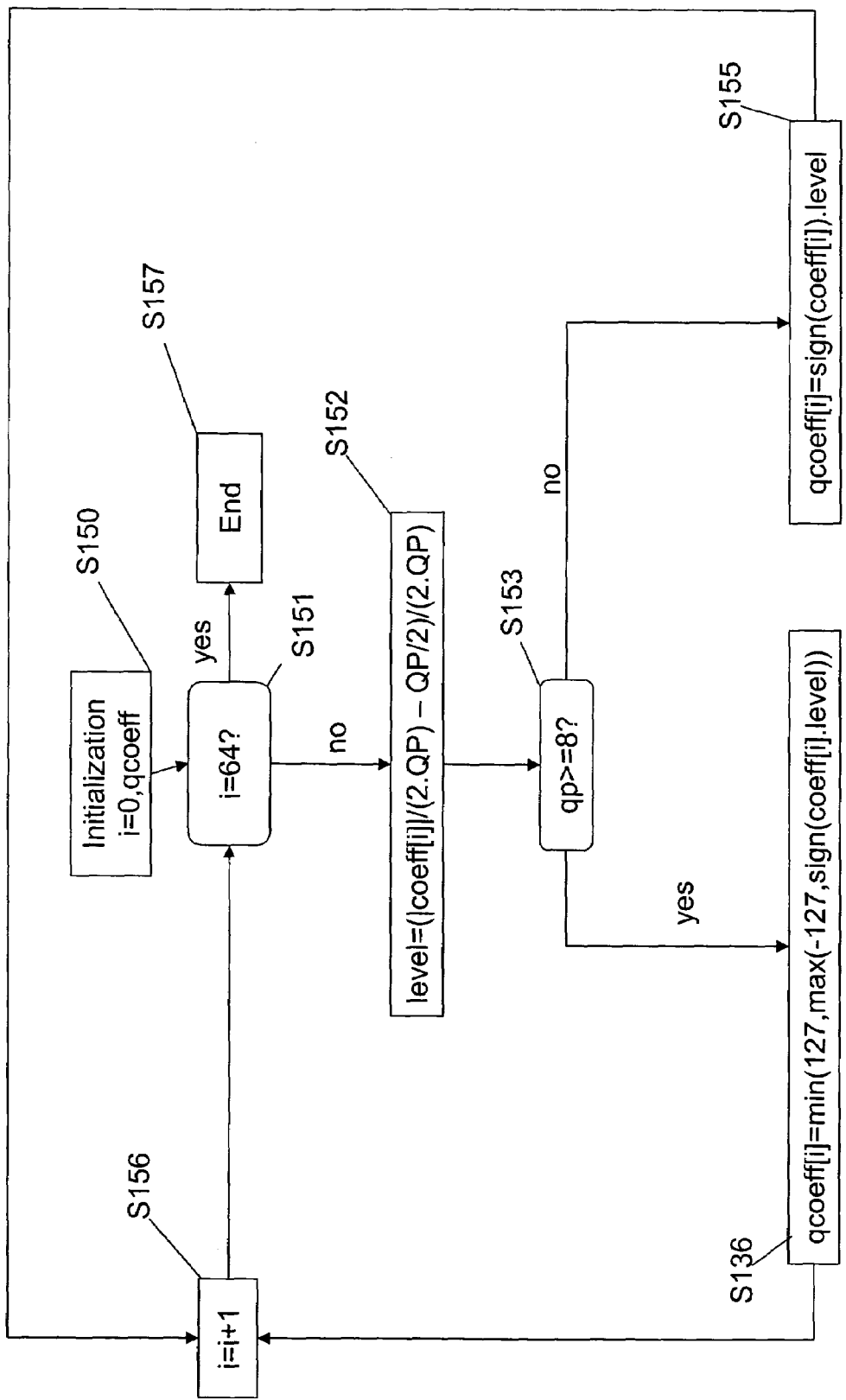
FIG. 5*c* is an algorithm representing the different operations of quantization of the INTER macroblocks according to the H.263 version 2 standard.

This step is followed by the step S102 during which quantization is performed of the MBs of coefficients transformed according to the process described in FIG. 5c. During this process, each block of the MB is processed successively.

This process commences at step S150 by the initialization of the variable i to 0 and by the creation of the table qcoeff for receiving the quantized coefficients.

This step is followed by the step S151 which tests whether i is equal to 64.

If this is the case, the process terminates at step S157 and another block is passed on to if all the blocks of the image have not been processed.

In the opposite case, step S151 is followed by the step S152 which creates the variable level and sets it to the following value (|coeff[i]|/(2.QP)-QP/2)/(2.QP).

Here too QP indicates the quantization parameter of the MB.

Step S152 is followed by step S153 during which the value of QP is verified.

If QP is greater than 8, qcoeff takes the valid indicated by step S154, i.e. min(127,max(-127,sign(coeff[i]),level)).

Otherwise, qcoeff takes the value indicated by step S155, i.e.: sign (coeff[i].level).

These last two steps are followed by step S156 which increments the variable i by one unit and then S151 already described above is returned to. It will be noted that the table qcoeff is stored in unit 176 of FIG. 2a.

Returning to FIG. 5a2, when all the MBs have been quantized, step S102 is followed by step S103 during which the VLC encoding is carried out of the quantized DCT coefficients and the bitstream obtained is concatenated with the other encoding information (header, movement vector, bitstream of the preceding images).

This terminates the encoding of the INTER MBs of the P images.

Note that in the default encoding mode of the standard H.263 version 2, the bitstream corresponding to the DCT coefficients of each MB is preceded by its movement vector (if it exists) and by its MB header. All the MBs thus follow each other in the bitstream.

Step S102 already described is also followed by step S104 during which the inverse quantization of the current image is carried out. This step is followed by step S105 in which the inverse discrete cosine transform of the dequantized coefficients is performed. These last two processes will be described later at the time of the description of the decoding process.

For the INTRA MBs, step S105 is followed by step S106 during which the MB is stored in unit 176 of FIG. 2a.

For the INTER MBs, at step S111, the DCT coefficients of the reconstructed MBs are added to the corresponding MBs coming from the movement compensated image. The MBs so obtained are stored in unit 176 of FIG. 2a. The set of the stored MBs are re-positioned to form an image which will serve as reference for the encoding of the following images.

The implementation of the encoding/decoding of improvement hierarchical level 2 of the video data stream (L2 in FIG. 3b) will be little different from that of the basic level L1.

An image B will thus, by way of example, be inserted between each image of the basic level as indicated in FIG. 3b.

When the two reference images of an image B are encoded, they will be stored in the storage unit 176 (step S106).

Using FIGS. 5a1 and 5a2, the differences between the encoding of the basic level and that of the temporal improvement level 2 will now be set forth.

It may be considered that the encoding of an image B commences with step S99 (FIG. 5a1) when the number of the current image is not a multiple of 2. At this step, the current image is stored in unit 176.

This step is followed by step S113 during which it is verified that the two reference images necessary for the encoding of current image B have actually been encoded.

If this is not the case, step S98 is returned to in order to receive the following image.

If this is the case, this step is followed by step S107a (FIG. 5a2) during which two movement estimations (forward and backward) are made. The movement estimation algorithm applied is in all respects identical to that used at step S107.

Three types of movement compensation are then carried out at step S108a (forward, backward and bidirectional). In addition, at this step, there is added a procedure of averaging the two MBs necessary for the prediction in bidirectional mode.

The control of the type of MB carried out at step S110a is made by selecting one type from the types forward, backward and bidirectional.

The encoding of the prediction error which is then performed at steps S109a, S101a, S102a, S103a is identical in every respect to the encoding performed for the INTER mode (steps S109, S101, S102, S103).

The quantization parameter QP of level 2 will, by way of example, be equal to 13. By contrast to the P images (see steps S104, S105, S106 and S111 described above), the reconstruction of the encoded MBs is not proceeded with since the B image will never serve as reference.

The encoding of the B images of level 4 (L4 in FIG. 3b) will be in every respect identical to that which has just been described, apart from the two reference images utilized which will change. Thus, in this case, the EI and/or EP images will be used, which are stored in unit 176 of FIG. 2a at step S106b, as references for the B images of this level.

Note that the quantization parameter QP of level 4 will, by way of example, be equal to 5.

Furthermore, the encoding of the levels 2 and 4 may be performed sequentially or in parallel.

The encoding of the hierarchical level 3 of spatial improvement (L3 in FIG. 3b) commences when the number of the current image is a multiple of 2 (S99, FIG. 5a1) and when the reference image necessary for the encoding of the current image has been encoded and stored in unit 176 of FIG. 2a (step S114).

The encoding of an image EI or EP next continues in parallel with steps S112 and S107b.

At step S112, an interpolation of the basic image stored in unit 176 at step S106 and corresponding temporally to the current image, is carried out and is in turn stored in unit 176.

Next the difference is calculated between the original image and the image interpolated at step S109b and that difference is stored in unit 176.

If the basic image is an image I, the improvement image will be an image EI and the control unit 178 then decides at step S110b to encode all the MBs of the image in upward mode. The upward mode consists of encoding the difference stored in unit 176 using the same methods as for an INTRA image (steps S101b, S102b, S103b, S104b, S105b respectively corresponding to steps S101, S102, S103, S104, S105 described earlier).

The encoding of an image EI continues at step S111b with the reconstruction of the encoded image and by its storage at step S106b in unit 176.

The reconstruction consists of adding to the MBs coming from step S105b the corresponding MBs (with the same spatial position) obtained by interpolation of the basic image (step S112). This reconstructed image will serve as reference for the following images.

When the basic image is a P image, the control unit chooses to encode the MBs of the image of the spatial implement level 3 in upward or forward mode (image EP).

The choice of the encoding mode of the MBs is made at step S110b.

The encoding of an image EP also commences with an interpolation of the image of the basic level (step S112).

Next the difference is calculated (step S109b) between the original image and the interpolated image and that difference is stored in unit 176. Two images are thus stored in unit 176: the interpolated basic level image and the image of the preceding spatial improvement level (EI or EP).

This last image is used at step S107b to carry out a movement estimation in the current image. A movement vector is then obtained for each MB of the current image.

Step S107b is followed by step S108b during which the movement compensation of the reference image is carried out.

This step is followed by step S109b during which the control unit 178 chooses the encoding mode and the mode is followed which makes it possible to minimize the difference between the original MB and the predicted MB.

Step S109b is followed by steps S101b, S102b, and S103b for the encoding, and the quantization parameter QP for level 3 is, by way of example, equal to 5.

Step S102b is also followed by steps S104b, S105b and S111b for the reconstruction of the image which will be stored in unit 176 at step S106b.

Figure 6:
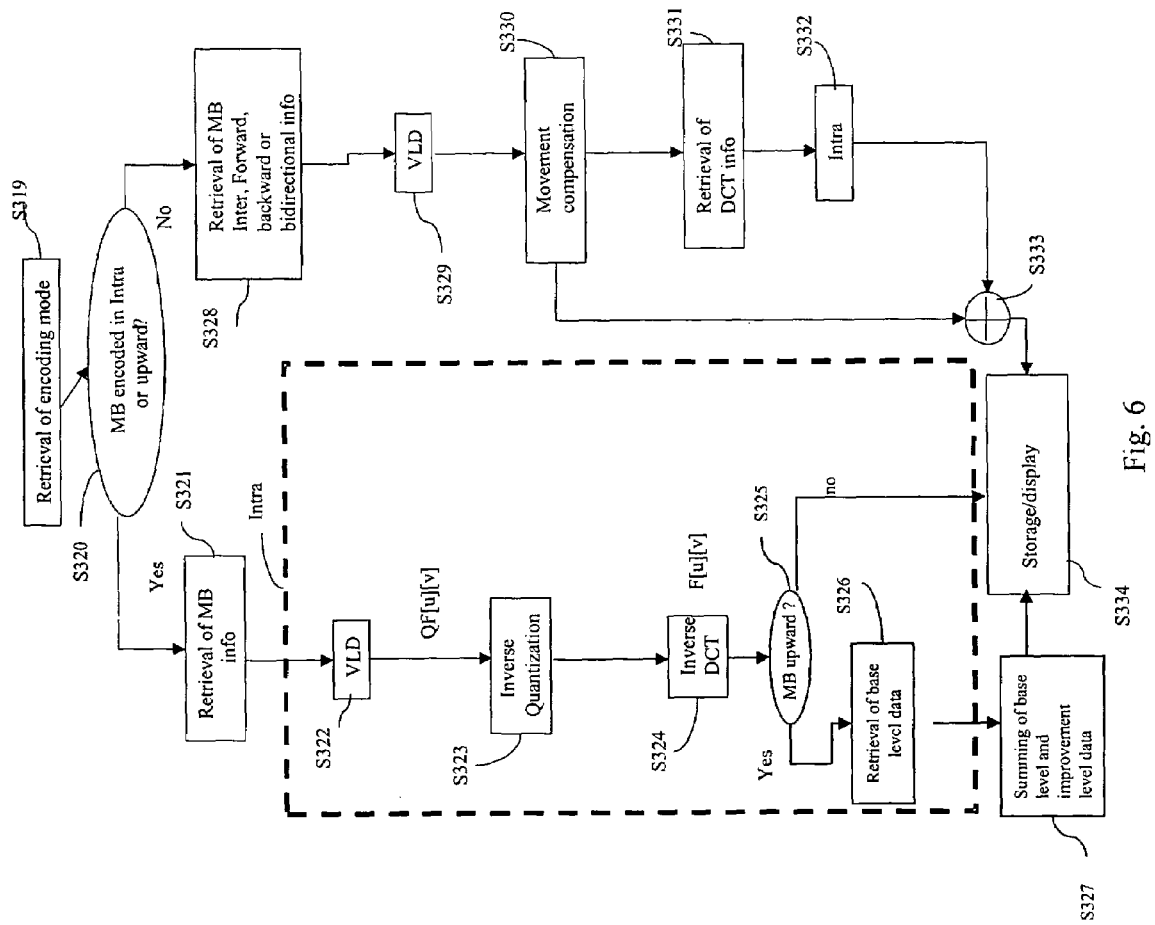
FIG. 6 represents a decoding algorithm according to the H.263 version 2 standard.

It should be noted that the processes explained below with reference to FIG. 6 are only involved at step S25 of the algorithm of FIG. 4 and are implemented by the receiving apparatus (central computer 112).

FIG. 6 illustrates the method of decoding the MBs encoded in INTRA mode (steps S321 to S324) or in INTER mode (step S328 to S333) implemented by the calculation unit 192 of the receiving apparatus 112 (FIG. 2b).

The algorithm in FIG. 6 commences with a first step S319 which retrieves the encoding mode of the current MB written in the bitstream stored in unit 194 of FIG. 2b.

Step S319 is followed by step S320 which performs a test in order to know whether the MB has been encoded in INTRA or upward mode.

If that is the case, step S320 is followed by step S321 which retrieves, from the storage unit 194 of the receiving apparatus 112, the statistical coefficients (variable length codes) linked to that MB.

Step S321 is followed by step S322 which decodes those coefficients according to the table of coefficients described in the standard H.263+ cited above. The coefficients thus obtained form a set of two dimensional data QF[u][v].

Step S322 is followed by step S323 which dequantizes the values of QF[u][v] according to an inverse quantization algorithm to obtain the two dimensional table F[u][v].

The inverse quantization algorithm of a MB is the following:

```
for (i = 0; i < 64; i++)
{
    if (qcoeff[block * 64 + i])
    {
        if (advanced_intra_coding && Mode == MODE INTRA )
        {
            /* Advanced intra coding dequantization */
            rcoeff[block * 64 + i] = (QP * (2 * qcoeff[block * 64 + i]));
        }
        else
        {
            if ((QP % 2) == 1)
                rcoeff[block * 64 + i] = QP * (2 * abs
                    (qcoeff[block * 64 + i]) + 1);
            else
                rcoeff[block * 64 + i] = QP * (2 * abs
                    (qcoeff[block * 64 + i]) + 1) - 1;
            rcoeff[block * 64 + i] = signe
                (qcoeff[block * 64 + i]) * rcoeff[block * 64 + i];
        }
    }
    else
        rcoeff[block * 64 + i] = 0;
}
if (Mode == MODE INTRA && (!advanced_intra_coding))
{
    rcoeff[block * 64] = qcoeff[block * 64] * 8;
}
```

In this algorithm, block is a variable taking the values 0, 1, 2 or 3 to cover all the blocks of a MB, qcoeff represents the quantized coefficients obtained after the decoding of the blocks encoded in VLC mode, rceoff represents the DCT coefficients obtained after inverse quantization, Mode is the encoding mode of the MB, QP is the quantization parameter of the MB, abs(a) is the absolute value of a, "advanced_intra_coding" is a particular encoding mode which is not explained here since it will not be used in the description of the embodiment.

Step S323 is followed by the step S324, in which the values of the pixels of the current MB are reconstructed as a function of the DCT coefficients F[u][v] using the decoding method described in the article "*Fast Algorithms for the Discrete Cosine Transform*", E. Feig and S. Winograd, *IEEE Trans. On Signal Proc.*, vol. 40, No. 9, September 1992.

Step S324 is followed by step S325 during which it is tested whether the MB is encoded in upward mode.

If that is not the case (the MB is a MB encoded in INTRA mode); the values are stored at step S334 in unit 194 of FIG. 2b in order to be viewed on unit 200 and/or stored in the long duration storage unit 198.

If it is a MB encoded in upward mode, step S325 is followed by step S326. During this step, if it is the first upward MB processed in that image, the basic image stored in unit 194 of FIG. 2b is interpolated and the data relative to the MB situated in the same spatial position as the current MB are retrieved.

Step S326 is followed by step S327 during which the data coming from the basic MB and the data coming from the improvement MB are added together.

Step S327 is followed by step S334 which stores the decoded MBs in unit 194 of FIG. 2b.

Returning to step S320, if the MB is not encoded in INTRA or upward mode, step S320 is followed by step S328 which retrieves the movement vector (or the vectors in bidirectional mode) encoded in VLC mode in the bitstream.

Step S328 is followed by step S329 which decodes the statistical coefficients so as to obtain the movement vector (respectively the movement vectors in bidirectional mode).

Step S329 is followed by step S330 during which the MB of the reference image (respectively the MBs of the reference images) is compensated, i.e. the MB is displaced by the movement vector so calculated.

The reference images vary depending on the encoding mode:

If it is a MB encoded in INTER mode, the preceding image of the basic level is used;

If it is a MB encoded in forward mode, use is made of the preceding image obtained after the decoding of levels 1 and 3 (if the current image is a B image of level 2, only level 1 is used);

If it is a MB encoded in backward mode, use is made of the following image obtained after the decoding of levels 1 and 3 (if the current image is a B image of level 2, only level 1 is used);

If it is a MB encoded in bidirectional mode, use is made of the preceding and following images obtained after the decoding of levels 1 and 3 (if the current image is a B image of level 2, only level 1 is used).

The reference images are stored in unit 194 of FIG. 2b while they are necessary.

Step S330 is followed by step S331 which retrieves the DCT statistical coefficients representing the difference MB and stores them in the storage unit 194.

Step S331 is followed by step S332 which reconstructs the difference MB on the basis of these statistical coefficients following the INTRA decoding described earlier.

Step S332 is followed by step S333 which calculates the sum of the compensated MB and of the difference MB.

Step S333 is followed by step S334 which stores the decoded MBs on unit 194 for being viewed on unit 200 and/or stored on the long duration storage unit 198 (FIG. 2b).

Returning to FIG. 4, in normal operation, the sending/receiving unit 182 of the sending unit of FIG. 2a (sources of video data 51 to 56) only transmits to the central computer 112 (receiving apparatus) the part of level 1 of the video sequence, i.e. the part containing the headers and the movement vectors of each MB encoded of each image (step S11).

Step S11 is followed by step S12 at which the control unit 206 of the central computer verifies the correct reception of the movement vectors coming from each sending apparatus connected to the network.

If for one second, no movement vector is received from a sending apparatus, an alarm is triggered at step S120. This alarm consists of displaying a message on screen 200 of FIG. 2b indicating that an incident is occurring in the room where the sending apparatus is situated (for example, the camera is unplugged or defective). Note that each sending apparatus is recognized by virtue of its connection number according to the IEEE1394 standard (node number on the IEEE1394 bus) transported in the packets in accordance with the IEEE1394 standard.

Furthermore, on installation of the system, the user associates a room name (kitchen, bedroom 1, etc.) with each connection number, and this name is stored on the hard disk 196 of the central computer. The calculation unit 192 reads this name in case of alarm.

In the opposite case (good reception), the central computer receives at step S13 header data and movement vectors from each sending apparatus connected to the network.

This information represents the temporal activity of the video sequence which is present on the sending apparatus concerned. Furthermore, this information gives rise to a very low rate when transmitted over the network, which is particularly advantageous.

The information coming from each sending apparatus and obtained by the receiving apparatus is processed at steps S14, S15, S16 and S17 in parallel for each apparatus.

Following the respective steps, the temporal information obtained is analyzed (S14) and, depending on the result of the analysis (S15), it is decided:

either to generate a request intended for the sending apparatus which transmitted that temporal information in order to later obtain information representing the spatial activity of the video sequence concerned (S17), or not to generate such a request (S16).

Figure 7:
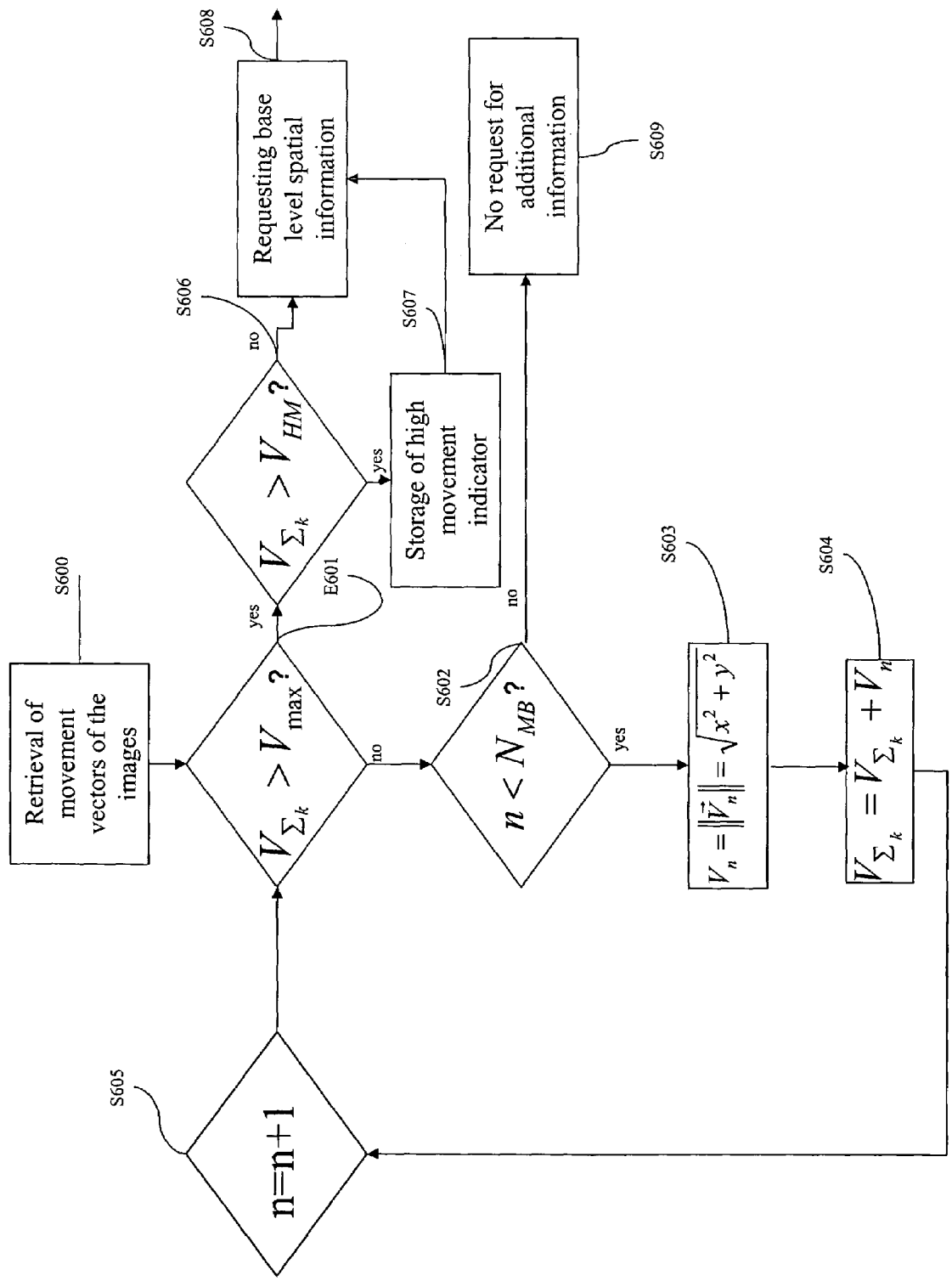
FIG. 7 is an algorithm following and detailing the steps S13 to S17 of the algorithm of FIG. 4.

Steps S14, S15, S16 and S17 are reproduced in more detail in the algorithm of FIG. 7 which comprises different instructions or portions of code corresponding to steps of the method according to the invention.

The execution of this algorithm by the calculation unit 192 of the central computer 112, and thus the execution of the computer program P stored in the storage unit 194 or on the hard disk 196 and which relies on the algorithm, makes it possible to implement the method according to the invention in the computer 112.

The algorithm commences at step S600 by the reception of the movement vectors and of the header data of an image. This information is received by the IEEE1394 card and forwarded to the temporary storage unit 194. For each image, the calculation unit 192 calculates the cumulative norm $V_{\Sigma k}$ of all the movement vectors of the MBs of the image, which amounts to determining an index of temporal activity of the video sequence considered on the basis of the temporal information obtained. $V_{\Sigma k}$ is initialized to the value 0 at step S600, the index k here indicating the number of the current image.

Step S600 is followed by step S601 at which the determined index $V_{\Sigma k}$ is compared to a limit $V_{max}$ (first predetermined threshold index). The limit $V_{max}$ is, for example, empirically set by the user on installation of the system. For this he could use, for example, a set of training video sequences having heterogeneous movements, which would enable him to decide visually beyond what movement an alarm must be triggered. The cumulated norm of the movement vectors will then be kept and will serve as limit $V_{max}$.

If the index $V_{\Sigma k}$ is less than $V_{max}$, step S601 is followed by step S602 which verifies that the number n of the current MB is less than the number of MBs in an image $N_{MB}$.

If this is the case, step S602 is followed by step S603 during which calculation is made of the norm $V_n$ of the movement vector of the current MB, x and y representing the two components of the vector.

$V_n$ is added to $V_{\Sigma k}$ at step S604 and this step is followed by step S605 which increments n by one unit.

If during step S602 n reaches $N_{MB}$, then this step is followed by a step S609 during which it is decided not to request supplementary information for the current image. This step is then followed by step S600 already described to pass on to the analysis of the following image.

If during step S601 the index $V_{\Sigma k}$ is greater than $V_{max}$, this means that a significant movement has been detected by the sending apparatus concerned, and step S601 is then followed by step S606 during which comparison is made between $V_{\Sigma k}$ and $V_{HM}$ with represents an index of strong movement (second predetermined threshold index).

If $V_{\Sigma k}$ is greater than $V_{HM}$, this means that a strong movement has been detected and an indicator of strong movement is then stored in the temporary storage unit 194 of FIG. 2b (S607).

For example, $V_{HM}=\sqrt{16^2+16^2}$, which means that at least one MB has moved with a displacement such that it no longer covers the original MB.

Steps S606 and S607 are then followed by step S608 which transmits a request to the sending apparatus (camera) concerned for obtaining information representing the spatial activity of the video sequence considered, i.e. spatial information of level 1 (DCT data).

If $V_{\Sigma k}$ is less than or equal to $V_{HM}$ (the movement detected is not considered as a strong movement), then step S606 is followed by step S608 already described.

It will be noted that in all cases, step S601 is followed by step S602 until all the MBs of the image have been processed and the final value $V_{\Sigma k}$ is stored in the temporary storage unit 194.

It will be noted that, whatever the result of the comparison test concerned at step S606, information representing the spatial activity of the video sequence considered will be requested at step S608.

Returning to FIG. 4, if no movement has been detected at step S15, the latter is followed by step S16 during which the decision not to send any request is taken.

In case of movement detection (S607), a request is sent to the sending apparatus concerned at step S17 (S608). This request is received by the sending apparatus concerned, which triggers the transmission at step S18 of spatial information (level 1 DCT data).

This spatial information is received by the sending apparatus 112 (central computer) at step S19 and is analyzed at step S20.

Figure 8:
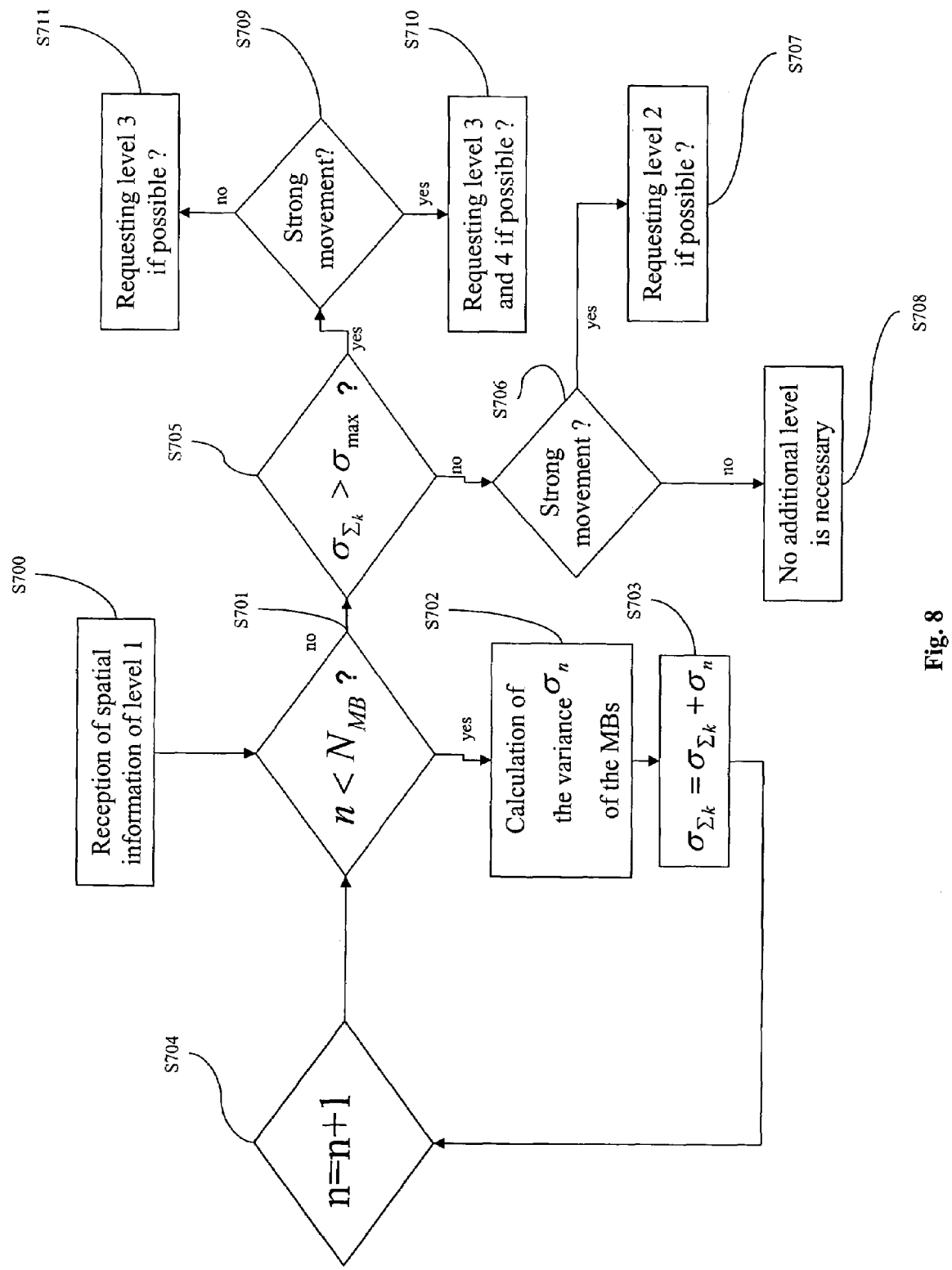
FIG. 8 is an algorithm following and detailing the steps S19 to S21 of the algorithm of FIG. 4.

FIG. 8 comprises different instructions or portions of code corresponding to steps of the method according to the invention.

The execution of this algorithm by the calculation unit 192 of the central computer 112, and thus the execution of the computer program P stored in the storage unit 194 or on the hard disk 196 and which relies on the algorithm, makes it possible to implement the method according to the invention in the computer 112.

FIG. 8 illustrates the process implemented on reception of the level 1 DCT data the process being represented in FIG. 4 by steps S19, S20, S21, S22 and S23.

It will be noted that step S22 is optional.

The algorithm commences at step S700 by the reception of the DCT data. At this step, n, $\sigma_{\Sigma k}$ and $\sigma_n$ are initialized to 0, where $\sigma_n$, d $\sigma_{\Sigma k}$ respectively designate the variance of the $n^{th}$ MB and the cumulated variance of the n first MBs.

Step S700 is followed by step S701 which verifies that all the MBs of the current image have not been processed.

If that is the case ($n<N_{MB}$), step S701 is followed by step S702 during which calculation is made of the variance of the current MB, $\sigma_n$.

Step S702 is followed by step S703 at which the value of $\sigma_{\Sigma k}$ is increased by $\sigma_n$, which amounts to determining an index of spatial activity of the video sequence considered on the basis of the spatial information obtained.

This step is followed by the step S704 during which the following MB is passed on to by incrementing n by one unit.

If at step S701 all the MBs have been processed ($n=N_{MB}$), this step is followed by the step S705 during which $\sigma_{\Sigma k}$ is compared to a predetermined threshold index $\sigma_{max}$. In the same way as for $V_{max}$, $\sigma_{max}$ is, for example, set empirically.

If at step S705, $\sigma_{\Sigma k}$ is less than $\sigma_{max}$ (low spatial activity), this step is followed by step S706 during which the presence of the high movement indicator $V_{HM}$ is verified which it was possible to determine at step S606 of FIG. 7 and stored at step S607.

If it is present, step S706 is followed by step S707 during which the decision is taken to generate a request for obtaining level 2 (request for supplementary temporal information) on the part of the sending apparatus.

In the opposite case (no indication of high movement), step S706 is followed by step S708 during which it is decided not to request supplementary temporal information on account of the spatial and temporal activity. Note that $\sigma_{\Sigma k}$ is stored in the temporary storage unit 194 at step S705.

Returning to step S705, if a high spatial activity has been detected ($\sigma_{\Sigma k > \sigma max}$), then this step is followed by step S709.

During this step the presence of the high movement indicator is verified.

If it is present, step S709 is followed by step S710 during which the decision is taken to generate a request for obtaining supplementary information i.e. levels 3 (request for supplementary spatial information) and 4 (request for supplementary temporal information) on the part of the sending apparatus concerned.

In the opposite case (no indicator of high movement), step S709 is followed by step S711 during which the decision is taken to generate a request for obtaining level 3 (request for supplementary spatial information) on the part of the sending apparatus concerned, since only a high spatial activity is detected.

Thus, for each sending apparatus (source of video data) which has transmitted first temporal information (movement detected) to the receiving apparatus 112, it has been possible to obtain first spatial information which has been analyzed.

Depending on the result of the analysis and on the detection or not of high movement (second threshold), it is then decided whether or not to request supplementary spatial and/or temporal information (spatial and/or temporal improvement layers).

In this manner what is known as subscription levels have been selected which, theoretically, should be requested from each sending apparatus concerned on account of the decision taken at steps S707, S710 and S711 of FIG. 8.

It will be noted that the invention thus makes it possible to select remotely and in an automatic and centralized manner the sending apparatuses which hold pertinent video data.

It should be noted that, in certain cases, the cost of calculation induced by the entirety of the decoding processes is not manageable in real time by the receiving apparatus 112. This is because it is possible for this computer not to be dedicated to the video surveillance application and, for example, it may have in charge other applications such as video games.

However, even in the ideal case in which the receiving apparatus is dedicated to video surveillance it is also possible that the same problem will have to be faced. This is because it may occur that several movements are detected simultaneously at step S15, by several sending apparatuses respectively.

Even if a current PC computer can easily manage the decoding of a video stream in real time, it becomes much more difficult to manage several operations of decoding in parallel without the display speed being affected. A risk thus exists of causing a phenomenon of congestion at the input of the computer, or even an uncontrolled stoppage of the latter.

A centralized system using several sending apparatuses (for example cameras) must be able to manage such cases. To achieve this, a solution is proposed making it possible to reduce the calculation load of the receiving apparatus 112 by seeking a compromise between all the streams which are theoretically and optimally to be transmitted by several sending apparatuses while tending to favor the most pertinent streams.

This solution is set up at the end of the process of selecting the levels of scalability by the sending apparatus (S21) before sending requests to the apparatuses concerned. In this case, rather than transmitting the requests directly after their generation, they are stored in unit 194 of FIG. 2b for use in step S22.

Figure 9:
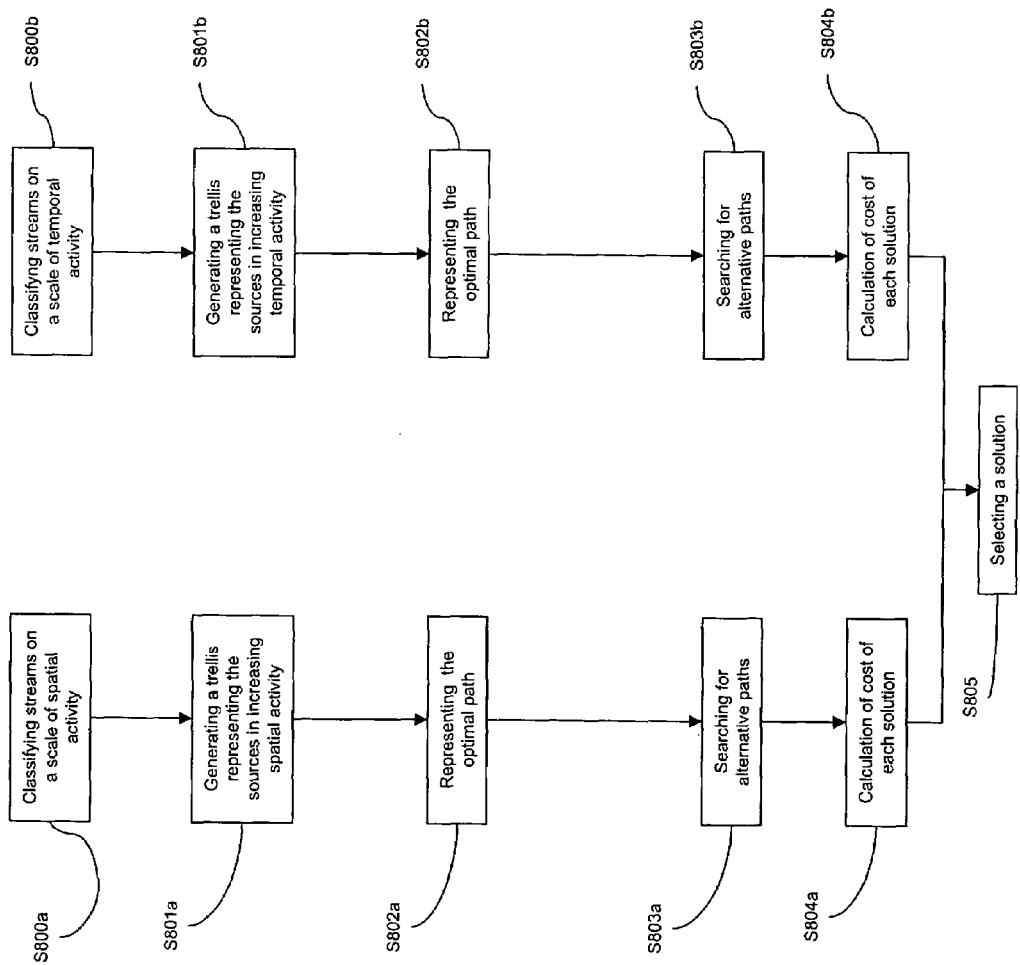
FIG. 9 is an algorithm following and detailing the operations carried out at step S22 of FIG. 4.

The processes implemented in step S22 are illustrated by FIG. 9 in the form of an algorithm comprising two processes which will be executed in parallel.

The processes are executed by the calculation unit 192 of the central computer 112 (FIG. 2b).

Figure 10:
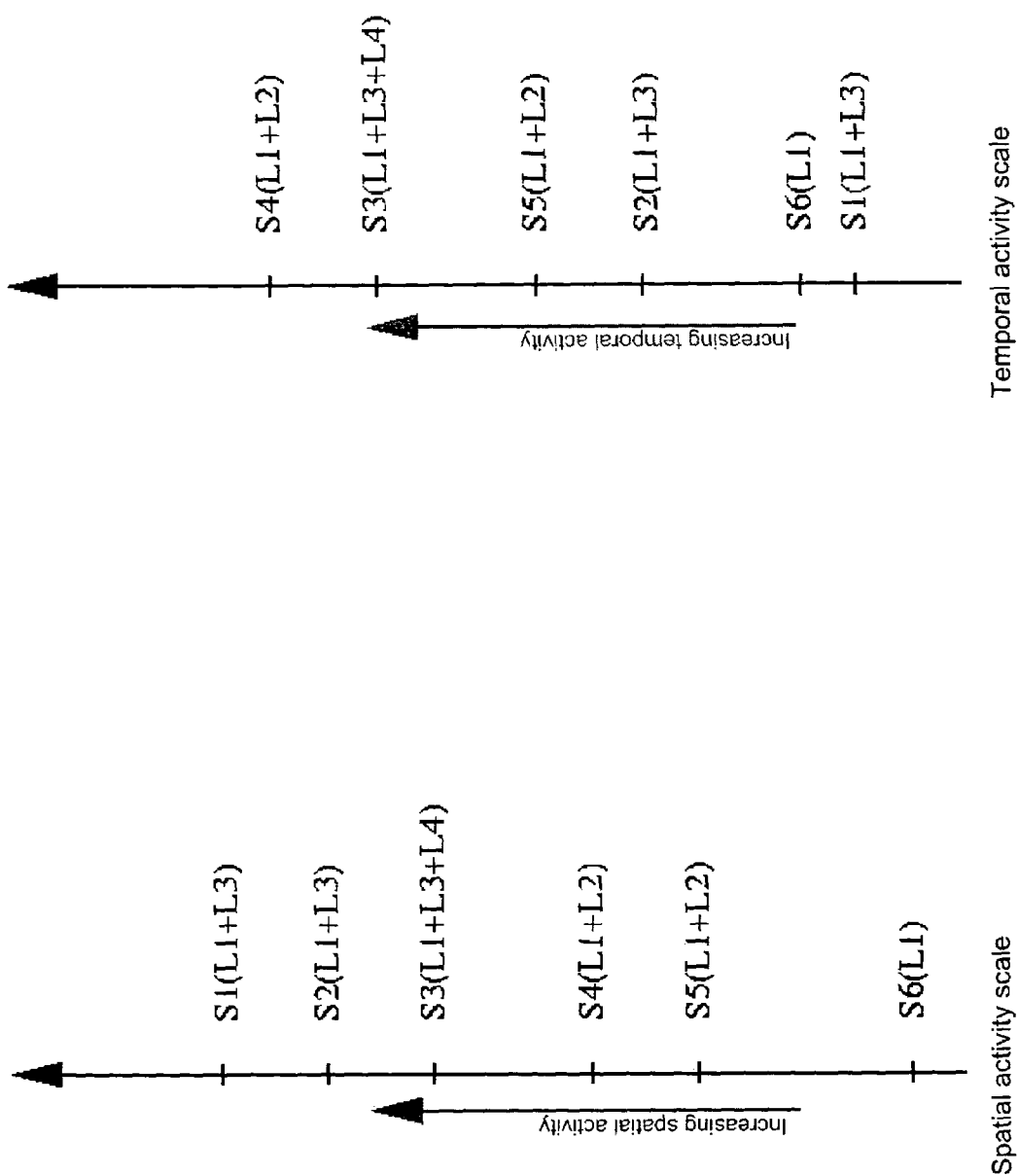
FIG. 10 is a diagram of two scales by which the different sending apparatuses of the network are classified according to their increasing spatial and temporal activities.

The first process (respectively the second process) commences at step S800a (and respectively S800b) by the classification of the streams on a scale of spatial activity (respectively temporal) as represented in FIG. 10.

For this the values of $V_{\Sigma k}$ determined by the algorithm of FIG. 7 (respectively the values of $\sigma_{\Sigma k}$ determined by the algorithm of FIG. 8) are retrieved of the last N images received and stored in the temporary storage unit 194. N=10 will for example be taken.

These N values are added together to estimate the spatial activity, on the one hand, and temporal activity, on the other hand, of each of the sending apparatuses (video source) S1, S2, S3, S4, S5, S6 in order to classify them in ascending order of the activities on the two respective scales illustrated in FIG. 10. Si represents the i-th sending apparatus and Li represents the level of scalability i obtained and, theoretically and in an optimum manner, to be obtained.

Step S800a (respectively S800b) is followed by step S801a (respectively S801b) during which a Viterbi type trellis is generated representing along the x-axis the sending apparatuses in ascending order of the activities.

Figure 11:
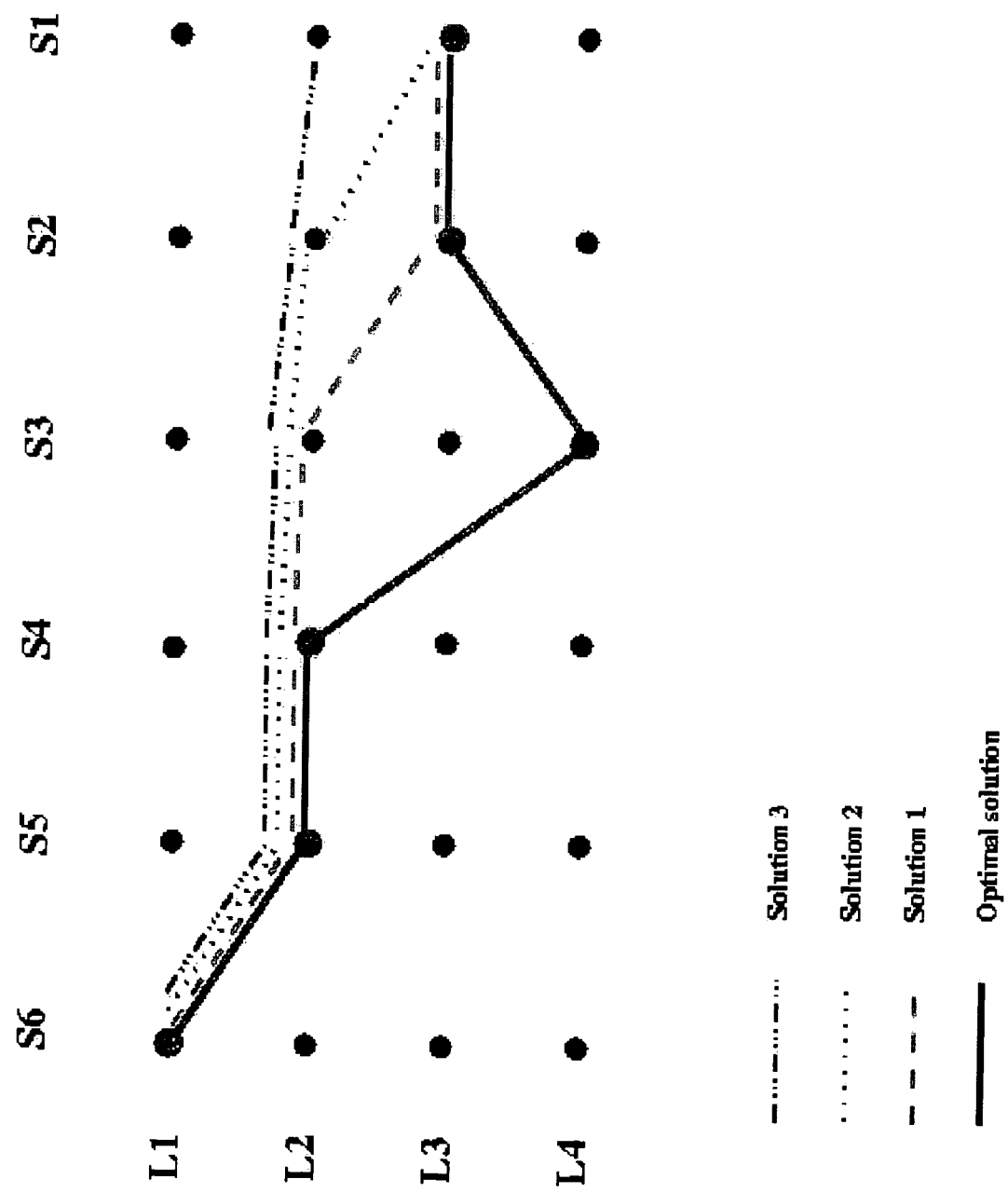
FIG. 11 illustrates a Vitterbi trellis dedicated to the spatial activity of the sending apparatuses classified according to one of the scales of FIG. 10.
Figure 12:
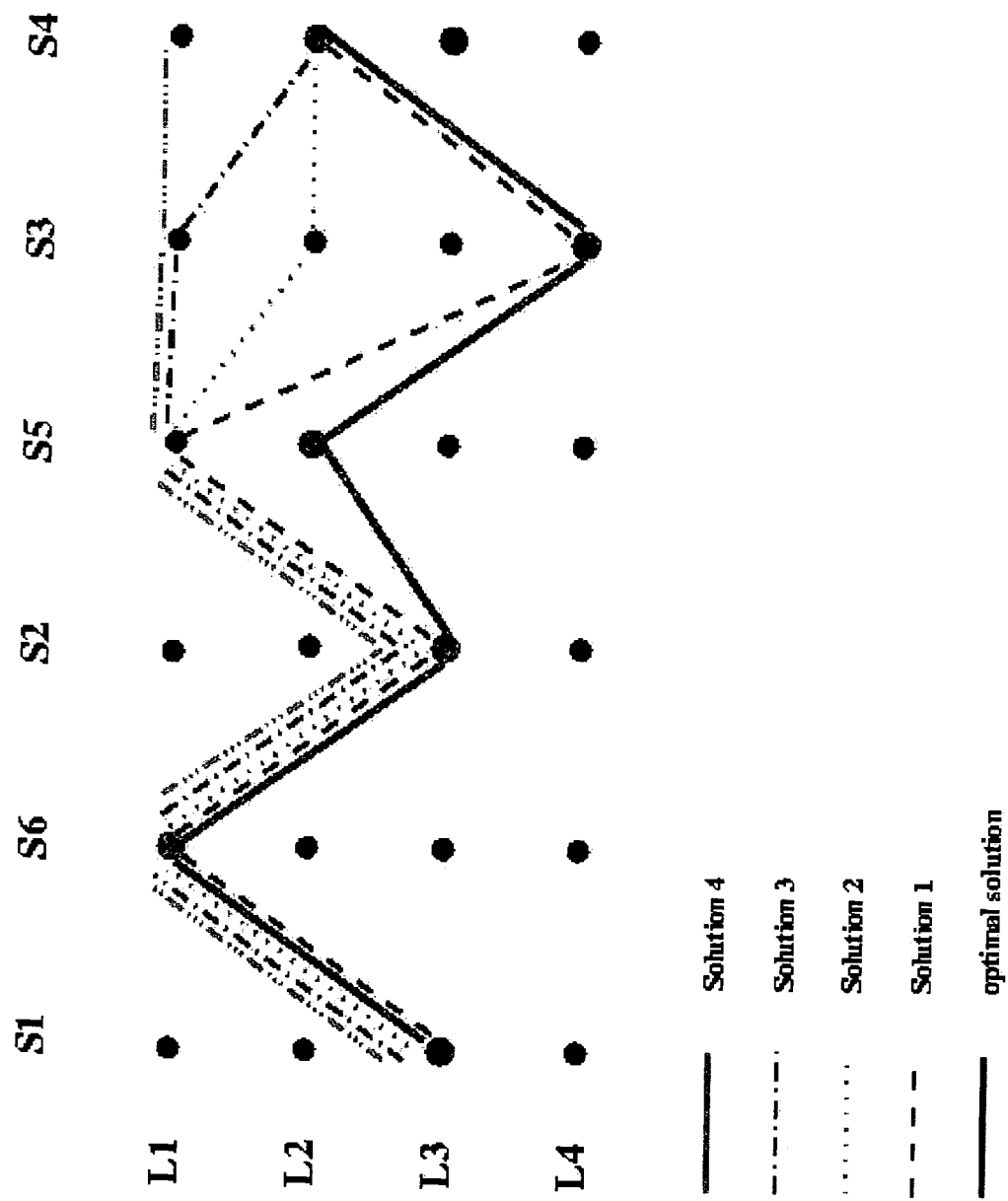
FIG. 12 illustrates a Vitterbi trellis dedicated to the temporal activity of the sending apparatuses classified according to one of the scales of FIG. 10.

These trellises are represented in FIGS. 11 and 12 and are dedicated respectively to the spatial and to the temporal activity.

In each trellis, each sending apparatus is, initially, represented on the y-axis by its optimum level of subscription. A subscription corresponds to the number of hierarchical level assigned to each sending apparatus after execution of the algorithms of FIGS. 7 and 8 and that each apparatus should theoretically and optimally transmit to the receiving apparatus 112.

The highest levels of each subscription are next linked together at step S802a (respectively S802b) and the path so obtained for each trellis is said to be optimum.

Step S802a (respectively S802b) is followed by step S802b (respectively S803b) during which paths for going through each alternative trellis are determined. These alternative paths are not optimum in terms of quality but enable the decoding cost associated with them to be reduced. They may then represent a better decoding cost/quality compromise than the optimum path.

These alternative paths are generated in several steps, each trellis being gone through separately.

At each step, the subscription level is reduced of the sending apparatus having the least spatial activity (respectively the least temporal activity) and subscribing to more than one hierarchical level of spatial and/or temporal information.

Practically speaking, the highest spatial scalability level (respectively temporal scalability level) is deleted from the subscription of the apparatus concerned.

Thus for the alternative path considered, the apparatus concerned contributes to a reduced spatial and/or temporal hierarchical level.

It will be noted that each time a trellis is gone through a level is deleted only at a single apparatus.

At the end of the process, several alternative paths have been defined as represented in FIGS. 11 and 12 by the solutions denoted 1, 2, 3, 4.

Step S803a (respectively S803b) is followed by step S804a (respectively S804b) during which a decoding cost is associated with each path. The decoding cost of a path corresponds to the estimation of the calculations necessary to perform the decoding of spatial and/or temporal information coming from the different sending apparatuses placed on the path.

Step S804a (respectively S804b) is followed by step S805 during which the best solution is selected, that is to say the optimum path in terms of decoding cost/quality for the group of the two trellises.

This selection consists of classifying the group of the solutions in ascending order of calculation costs. Next the path is chosen (and the associated subscription) having the decoding cost closest to (but remaining less than) the limit set by the decoding capacities of the receiving apparatus 112, i.e. its calculation capacity.

The corresponding requests are next sent to the sending apparatuses. Thus selection is made remotely and in an automatic and centralized manner of the sending apparatuses holding pertinent video data taking into account the calculation capacity of the receiving apparatus which centralizes the operations.

Thus the calculation resources of the receiving apparatus are used optimally.

Furthermore, the aforementioned decisions are taken by the receiving apparatus in a manner adapted to the content of the video data to transmit by the sending apparatuses.

It should be noted that if no path is compatible with the decoding capacities of the central computer 112, all the streams coming from the different sending apparatuses are transmitted using the hierarchical level 1 (L1).

The receiving apparatus will reject images when its capacities are exceeded. It could, for example, reject all the P images between two i images.

The calculation cost is determined depending on the type of scalability levels subscribed by each apparatus. It is assumed that, by virtue of a set of training sequences, the user has determined the mean decoding cost of each level of scalability L1, L2, L3 and L4, and the calculation costs of decoding the levels L1, L2, L3 and L4 are designated by C1, C2, C3, and C4 respectively.

These costs are stored on the hard disk 196 of the central computer 112 and the calculation unit 192 then reads these values on the hard disk to determine the calculation cost of a subscription of a given sending apparatus. If, for example, a subscription indicates that levels L1, L3 and L4 are required for an apparatus, the cost of this subscription will be the sum of the costs C1, C3 and C4.

The decoding cost of a video sequence, denoted O, is also referred to as the decoding complexity, and its determination corresponds to the determination of the total number of operations which are to be performed during a predetermined interval of time with a view to decoding a plurality of encoded macroblocks.

In order to determine this decoding complexity, a segment composed of $N_{INTRA}+N_{inter}$ images will be dealt with.

The complexity of such a segment is supplied by the following equation:

$$O = \left(N_{Intra} * MB_{Intra} * O_{Intra} + \sum_{i=0}^{N_{inter}} (MB^i_{intra} * O_{Intra} + MB^i_{Inter} + O_{Inter})\right)$$

where:
- $N_{Intra}$ is the number of images encoded in INTRA mode for the segment considered, the segment corresponds to a given number of images per second,
- $N_{Inter}$ is the number of images encoded in INTER or predictive mode for the segment considered,
- $MB_{Intra}$ is the number of macroblocks encoded in INTRA mode in an image encoded in INTRA mode,
- $O_{Intra}$ is the decoding complexity of a macroblock encoded in INTRA mode,
- $MB_{Intra}^i$ is the number of macroblocks encoded in INTRA mode in an image encoded in INTER mode,
- $MB_{Inter}^i$ is the number of macroblocks encoded in INTER mode in an image encoded in INTER mode,
- $O_{Inter}$ is the decoding complexity of a macroblock encoded in INTER mode.

It will thus be seen that the determination of the decoding complexity of the image segment defined above involves a prior step of analyzing the encoding mode used for encoding each macroblock. Next it is a question of determining the decoding complexity of each macroblock which was encoded according to a different encoding mode, that is to say determining the elementary number of operations which it is necessary to perform to carry out its decoding.

The determination of the decoding complexity of the above-mentioned segment next comprises a step during which the number of macroblocks encoded according to each of the different encoding modes is identified and, knowing the decoding complexity for each of these encoding modes, from this is deduced the total number of operations which it is necessary to perform during the predetermined interval of time in order to decode the plurality of encoded macroblocks constituting the segment defined above.

In the example described below, the encoding mode of an image in INTRA or INTER mode is first looked at, and then, depending on whether this is encoded in INTRA mode or INTER mode, the following procedure is carried out:

If the image is encoded in INTRA mode, then it suffices to take into account the decoding complexity of a macroblock and the number of macroblocks contained in that image, and then to multiply the figure obtained corresponding to the decoding complexity of an image encoded in INTRA mode by the number of images $N_{intra}$ encoded according to this mode.

If the image is encoded in INTER mode, it is then necessary to seek, within each image, the number of macroblocks encoded according to the INTRA or INTER encoding mode, and then to obtain for each image both the decoding complexity for the macroblocks encoded according to the INTRA encoding mode as well as the decoding complexity for the macroblocks encoded according to the INTER encoding mode.

It is then necessary to add these decoding complexities in order to obtain the total decoding complexity of an image encoded in INTER mode. It then remains to multiply this figure by the number of images $N_{inter}$ encoded in INTER mode.

It should be noted that the determination of the decoding complexity of a macroblock varies according to whether the latter is encoded in INTRA mode or in INTER mode.

As described below, the determination of the decoding complexity of a macroblock will be detailed depending on whether the encoding took place in INTRA mode or in INTER mode.

1) Encoding in INTRA mode

With the decoding taking place data block by data block, the decoding complexity of a macroblock is equal to the complexity related to the decoding of the four blocks which make it up.

More particularly, the decoding complexity of a block is determined by counting the number of elementary operations participating in the various algorithms used in the decoding process.

The values of the complexity related to the DCT decoding are supplied by the article "*Fast Algorithms for the Discrete Cosine Transform*", E. Feig and S. Winograd, *IEEE Trans. On Signal Proc.*, vol. 40, No. 9, September 1992.

Table 1 below details the determination of the decoding complexity of the different algorithms which participate in the decoding of a block using the different elementary operations.

TABLE 1

| processing | test | Multiplication | Addition | Allocation |
|---|---|---|---|---|
| VLD | | | | 64 |
| Inverse Q | 192 | 256 | | 192 |
| Saturation | 128 | | 64 | |
| Control | 2 | | 64 | 65 |
| Inverse DCT | | 94 | 454 | 64 |
| Total | 322 | 350 | 582 | 385 |

Preferentially, all these operations are considered to be elementary except the multiplication, which is considered to be equivalent to two elementary operations.

Thus the total decoding complexity of a macroblock (luminance components) encoded in INTRA mode $O_{intra}$ is 4*1989=7956 elementary operations.

2) Encoding in INTER mode

In the case where the macroblock is encoded in INTER mode, it is necessary to add, to the decoding complexity in INTRA mode, the decoding complexity related both to the reconstruction of the movement vector from the differential movement vector, as well as to the reconstruction of the macroblock (reconstruction of the difference macroblock and addition of this macroblock to the predicted macroblock).

The determination of the decoding complexity of these processes is detailed in table 2 below which supplies, for each process, the number of elementary operations which participate.

TABLE 2

| Processing | test | multiplication | Addition | Allocation |
|---|---|---|---|---|
| VLD | | | | 2 |
| Reconstruction of movement vector | 7 | 5 | 13 | 11 |
| Reconstruction of difference macroblock | 1288 | 1400 | 2328 | 1540 |
| Construction of predicted macroblock | | | 512 | 256 |
| Reconstruction of macroblock | | | 256 | 256 |
| Total | 1295 | 1405 | 3109 | 2065 |

Thus, for the INTER or predictive mode, the total decoding complexity of a macroblock encoded in INTER mode $O_{inter}$ is 7874 elementary operations.

From the above the decoding complexity O is deduced of a segment composed of $N_{Intra}+N_{inter}$ images and which was defined above.

When the encoding modes used are not solely the INTRA and INTER modes the following reasoning will be adopted as a first approximation: the decoding cost of the forward and backward MBs is identical to the INTER MBs, the decoding cost of the upward MBs is identical to that of the INTRA MBs and the decoding cost of the bidirectionnal MBs is twice that of the INTER MBs.

Thus, knowing the encoding modes of the MBs of the different images of the video sequence, the decoding cost of a video sequence is deduced by the method set out above.

As the decoding costs are expressed in numbers of elementary operations per second, they can thus be directly compared to the calculation capacity of the receiving apparatus 112 indicated by the operating frequency of its processor.

As soon as verification has been made at step S22 of FIG. 4 of the compatibility of the hierarchical levels of subscription of the different sending apparatuses with one of the constraints of the receiving apparatus 112, i.e. its calculation capacity, that step S22 is followed by step S23 which transmits the requests stored beforehand at step S21 to the sending apparatuses concerned.

Step S23 is then followed by step S24 during which the requests are received by the sending apparatuses, which triggers the transmission of the corresponding supplementary spatial and/or temporal information.

Step S24 is followed by step S25 during which the receiving apparatus 112 receives the video data, decodes them according to the process described earlier with reference to FIG. 6 and displays them on its screen 200.

It is still possible to improve the invention since, up to this point, only the decoding capacities of the receiving apparatus 112 have been taken into account as constraints.

However, in a network, it is known that the bandwidth available is also a constraint and it is thus essential to respect the constraints of bandwidth in order to avoid congestion phenomena.

Thus provision is made according to the invention to add to the receiving apparatus 112 a module for analysis of the network which will provide the bandwidth available on the network at step S22 of the algorithm of FIG. 4.

This information may be obtained by using a THROUGHPUT message as defined in the IEEE1394 standard. This message makes it possible to obtain the quantity of bandwidth (represented in terms of temporal units free in a cycle of 125 µs) available between each sending apparatus (camera) and the receiving apparatus (central server).

The rate necessary for each subscription is determined in the same manner that the calculation cost caused by each subscription was determined.

With the use of training sequences, a mean rate is associated with each level of scalability and this information is stored on the hard disk 196.

Next those data are read at step S22 to determine the rate induced by each subscription.

Next the path is chosen (and the associated subscription) having the decoding cost closest to (but remaining less than) the limit set by the decoding capacities of the receiving apparatus 112 and of which the rate induced will be compatible with the bandwidth available on the network.

It should be noted that the use of an IEEE1394 communication network implies that, for each isochronous connection, a channel must be reserved as well as the associated bandwidth. Reservation of the bandwidth is in fact a misnomer in the IEEE1394 standard since it is rather periods of time that are reserved in the cycles of 125 microseconds defined by the standard.

In normal operation, the header data and the movement vectors are transmitted in asynchronous mode which is the best adapted to this type of data. This mode of transmission indeed makes it possible to ensure the transport of the data without however requiring the reservation of an interval of time in a period of 125 microseconds, which in fact amounts to reserving a rate which may be greater than the rate induced by the movement vectors.

Furthermore, the asynchronous transmission mode guarantees the integrity of the data transmitted, which is essential given the importance for the receiving apparatus to continuously receive level 1 temporal information from all the sending apparatuses connected thereto. Indeed, an error could prevent the triggering of an alarm or trigger a false alarm.

As set out above, the non-reception of the temporal information for a set time, for example one second, must always trigger an alarm.

It may however be remarked that this type of incident may have several origins, not all being linked to an intrusion. It may be imagined, for example, that a surplus of asynchronous data will prevent certain header data from arriving in time.

Such an event may occur in the case of a high load on the IEEE1394 bar of a camera, on an intermediate bus or on the bus of the central computer and it is then a false alarm.

In other cases, the camera could be stopped by an intrusion and it is then clear that an alarm must be triggered.

The IEEE1394 standard makes it possible to know the load on an IEEE1394 bus and, consequently, an improvement could consist in verifying the load of the network in case of non-reception of the temporal information before the actual triggering of an alarm.

When an alarm is triggered on the other hand, all the data relating to a video sequence are transmitted in isochronous mode. Indeed, because these data must be displayed with a fixed speed, this mode is given priority.

What is claimed is:

1. A method of analyzing a video sequence present on a sending apparatus, in a communication network including a receiving apparatus, the video sequence being compressed and including information representing temporal activity of images of the video sequence and information representing spatial activity of the images of the video sequence, and the temporal and spatial information being distributed between one or more spatio-temporal hierarchical levels, the method comprising:

obtaining information representing the temporal activity of the video sequence present on the sending apparatus, analyzing the temporal information obtained, determining whether generation of a request destined for the sending apparatus for obtaining information representing the spatial activity of the video sequence is necessary, based on a result of the analyzing of the temporal information, and sending to the sending apparatus a request for information representing spatial activity, if it is determined that generation of the request is necessary.

2. The method according to claim 1, wherein the analysis of the temporal information obtained includes:

determining a temporal activity index of the video sequence on the basis of the information obtained, and comparing the index determined with a predetermined first threshold index.

3. The method according to claim 2, further comprising comparing the index determined with a predetermined second threshold index.

4. The method according to claim 1, further comprising:
obtaining information representing the spatial activity of the video sequence present at the sending apparatus,
analyzing the spatial information obtained, and
determining whether generation of a request destined for the sending apparatus for obtaining supplementary information representing the spatial activity of the video sequence is necessary, based on a result of the analyzing of the spatial information.

5. The method according to claim 4, wherein analyzing the spatial information obtained includes:
determining a spatial activity index of the video sequence on the basis of the spatial information obtained, and
comparing the index determined with a predetermined threshold index.

6. The method according to claim 4, wherein the method further comprises determining whether generation of a request destined for the sending apparatus for obtaining supplementary temporal information is necessary depending on the result of the analysis performed on the temporal and/or spatial information obtained.

7. The method according to claim 4, wherein the determining whether the generation of the request destined for the sending apparatus is necessary includes taking into account the calculation capacity of the receiving apparatus.

8. The method according to claim 4, wherein the determining whether the generation of the request destined for the sending apparatus is necessary includes taking into account the bandwidth available on the network.

9. The method according to claim 6, wherein, in the case that temporal and spatial information has been obtained from a plurality of sending apparatuses and obtaining supplementary temporal and/or spatial information from at least one of them has been deemed necessary, the method comprise classifying each sending apparatus with respect to the other apparatuses, as a function of the temporal information and spatial information obtained by that apparatus.

10. The method according to claim 9, wherein the set of sending apparatuses are represented in two Vitterbi type trellises, one dedicated to the temporal activity and the other to the spatial activity, and in each of which each apparatus is represented along the x axis and, according to the trellis concerned, each spatial or temporal hierarchical level obtained and/or to be obtained is represented along the y axis.

11. The method according to claim 10, comprising, for each trellis, determining an optimum path between the apparatuses by only taking into account, for each of them, the highest spatial or temporal hierarchical level.

12. The method according to claim 11, comprising, for each trellis, determining one or more alternative paths between the apparatuses by performing, for a given trellis, the following operations which are reiterated in order to determine a plurality of alternative paths:
going through the trellis considered,
deleting, according to the trellis considered, the highest spatial or temporal hierarchical level obtained and/or to be obtained for the sending apparatus having, as may be the case, the least spatial activity or temporal activity and having at least two hierarchical levels of information, so leading to the determination of an alternative path to which the aforementioned apparatus contributes for a reduced spatial and/or temporal hierarchical level.

13. The method according to claim 12, comprising associating a decoding cost with each alternative path determined, the decoding cost associated with a path corresponding to the estimation of the calculations necessary to perform the decoding of encoded spatial and/or temporal information coming from the different sending apparatuses placed on the path.

14. The method according to claim 13, comprising selecting the optimum path by determining among all the paths the one for which the decoding cost is the closest to the calculation capacity of the receiving apparatus, while remaining less than that capacity.

15. The method according to claim 13, comprising selecting the optimum path by determining among all the paths the one for which the rate induced is less than the bandwidth available on the network.

16. A device for analyzing a video sequence present on a sending apparatus, in a communication network including a receiving apparatus, wherein, the video sequence is compressed and includes information representing temporal activity of images of the video sequence and information representing spatial activity of the images of the video sequence, the temporal and spatial information being distributed between one or more spatio-temporal hierarchical levels, the device comprising:
a processor; and
a memory for storing a plurality of code portions, including;
a code portion for causing the processor to obtain information representing the temporal activity of the video sequence present at the sending apparatus,
a code portion for causing the processor to analyze the temporal information obtained, and
a code portion for causing the processor to determine whether generation of a request destined for the sending apparatus for obtaining information representing the spatial activity of the video sequence is necessary, depending on a result obtained in the code portion for causing the processor to analyze the temporal information.

17. The device according to claim 16, wherein the code portion for causing the processor to analyze the temporal information obtained includes:
a code portion to determine a temporal activity index of the video sequence on the basis of the information obtained, and
a code portion to compare the index determined with a predetermined first threshold index.

18. The device according to claim 17, comprising a code portion to compare the index determined with a predetermined second threshold index.

19. The device according to claim 16, wherein the video sequence includes image data blocks and video data in a plurality of spatio-temporal hierarchical levels.

20. The device according to claim 19, wherein the plurality of spatio-temporal levels includes a first hierarchical level including header data and movement vectors of the blocks of the images of the video sequence.

21. The device according to claim 20, wherein the information representing the temporal activity is the movement vectors.

22. The device according to claim 16, further comprising:
a code portion for causing the processor to obtain information representing the spatial activity of the video sequence present at the sending apparatus,
a code portion for causing the processor to analyze the spatial information obtained, and
a code portion for causing the processor to determine whether the generation of a request destined for the sending apparatus for obtaining the obtainment of supplementary information representing the spatial activity of the video sequence is necessary, as a function of the result of the analysis.

23. The device according to claim 22, wherein the code portion for causing the processor to analyze the spatial information obtained includes:
  a code portion to determine a spatial activity index of the video sequence on the basis of the spatial information obtained,
  a code portion to compare the index determined with a predetermined threshold index.

24. The device according to claim 22, wherein the device further comprises a code portion for causing the processor to determine whether the generation of a request destined for the sending apparatus for obtaining supplementary temporal information is necessary as a function of the result of the analysis performed on the temporal and/or spatial information obtained.

25. The device according to claim 22, wherein the code portion for causing the processor to determine whether to generate a request for obtaining supplementary information representing spatial activity takes into account the calculation capacity of the receiving apparatus.

26. The device according to claim 22, wherein the code portion for causing the processor to determine whether to generate a request for obtaining supplementary information representing spatial activity takes into account the bandwidth available on the network.

27. The device according to claim 24 further comprising a code portion for causing the processor to classify each sending apparatus with respect to the other sending apparatuses, as a function of the temporal information and spatial information obtained by that apparatus, as a function of the temporal information and spatial information obtained by that apparatus, in the case that temporal and spatial information has been obtained from a plurality of sending apparatuses and obtaining supplementary temporal and/or spatial information from at least one of them has been deemed necessary.

28. The device according to claim 16, wherein the set of sending apparatuses are represented in two Vitterbi type trellises, one dedicated to the temporal activity and the other to the spatial activity, and in each of which each apparatus is represented along the x-axis and, according to the trellis concerned, each spatial or temporal hierarchical level obtained and/or to be obtained is represented along the y-axis.

29. The device according to claim 28, comprising, for each trellis, a code portion for causing the processor to determine an optimum path between the apparatuses by only taking into account, for each of them, the highest spatial or temporal hierarchical level.

30. The device according to claim 29, comprising, for each trellis, a code portion for causing the processor to determine one or more alternative paths between the sending apparatuses and to make a provision for performing, for a given trellis, the following operations which are reiterated in order to determine a plurality of alternative paths:
  going through the trellis considered, and
  deleting, according to the trellis considered, the highest spatial or temporal hierarchical level obtained and/or to be obtained for the sending apparatus having, as may be the case, the least spatial activity or temporal activity and having at least two hierarchical levels of information, so leading to the determination of an alternative path to which the aforementioned apparatus contributes for a reduced spatial and/or temporal hierarchical level.

31. The device according to claim 30, comprising a code portion for causing the processor to associate a decoding cost with each alternative path determined, the decoding cost associated with a path corresponding to the estimation of the calculations necessary to perform the decoding of encoded spatial and/or temporal information coming from the different sending apparatuses placed on the path.

32. The device according to claim 31, comprising a code portion for causing the processor to select the optimum path by determining among all the paths the one for which the decoding cost is the closest to the calculation capacity of the receiving apparatus, while remaining less than that capacity.

33. The device according to claim 31, comprising a code portion for causing the processor to select the optimum path by determining among all the paths the one for which the rate induced is less than the bandwidth available on the network.

34. A communication receiving apparatus including an analyzing device according to claim 16.

35. A computer-readable medium storing executable instructions for causing a computer to perform a method of analyzing a video sequence present on a sending apparatus, in a communication network also including a receiving apparatus, the video sequence being compressed and including information representing the temporal activity of the images of the video sequence and information representing the spatial activity of the images of that video sequence, and the temporal and spatial information being distributed between one or more spatio-temporal hierarchical levels, the method comprising:
  obtaining information representing the temporal activity of the video sequence present on the sending apparatus,
  analyzing the temporal information obtained,
  determining whether the generation of a request destined for the sending apparatus for obtaining information representing the spatial activity of the video sequence is necessary based on the result of the analysis, and
  sending to the sending apparatus a request for information representing spatial activity, if it is determined that generation of the request is necessary.

36. A device for analyzing a video sequence present on a sending apparatus, in a communication network including a receiving apparatus, wherein the video sequence is compressed and includes information representing the temporal activity of the images of the video sequence and information representing the spatial activity of the images of that video sequence, and the temporal and spatial information is distributed between one or more spatio-temporal hierarchical levels, the device comprising at the receiving apparatus:
  means for obtaining information representing the temporal activity of the video sequence present at the sending apparatus;
  means for analyzing the temporal information obtained; and
  means for determining whether generation of a request destined for the sending apparatus for obtaining information representing the spatial activity of the video sequence is necessary, depending on the result of the analyzing of the temporal information.

* * * * *